(12) United States Patent
Zhan et al.

(10) Patent No.: US 10,791,686 B2
(45) Date of Patent: Oct. 6, 2020

(54) HYDROPONIC CULTIVATION UNIT AND SYSTEM

(71) Applicant: FUJIAN SANAN SINO-SCIENCE PHOTOBIOTECH CO., LTD., Quanzhou (CN)

(72) Inventors: Zhuo Zhan, Quanzhou (CN); Zhiyin Li, Quanzhou (CN); Zhen Lu, Quanzhou (CN); Ying Chen, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 332 days.

(21) Appl. No.: 15/868,102

(22) Filed: Jan. 11, 2018

(65) Prior Publication Data

US 2018/0132439 A1    May 17, 2018

Related U.S. Application Data

(63) Continuation of application No. 15/466,796, filed on Mar. 22, 2017, now Pat. No. 10,010,034, which is a continuation of application No. PCT/CN2016/102236, filed on Oct. 15, 2016.

(51) Int. Cl.
*A01G 31/00* (2018.01)
*A01G 31/02* (2006.01)
(Continued)

(52) U.S. Cl.
CPC ............. *A01G 31/02* (2013.01); *A01G 7/045* (2013.01); *A01G 31/06* (2013.01); *Y02P 60/216* (2015.11)

(58) Field of Classification Search
CPC .. A01G 31/02; A01G 31/06; A01G 2031/006; A01G 31/00; A01G 9/02;
(Continued)

(56) References Cited

U.S. PATENT DOCUMENTS 2,585,698 A * 2/1952 Spring .................... A01K 31/19
                                                          119/456
2,917,867 A * 12/1959 Bailey .................... A01G 31/06
                                                          47/62 E (Continued)

*Primary Examiner* — Trinh T Nguyen
(74) *Attorney, Agent, or Firm* — Syncoda LLC; Feng Ma

(57) ABSTRACT

A hydroponic cultivation system includes a plurality of hydroponic cultivation units vertically stacked one over another. Each unit is configured to provide a cultivation bed for the plants, and every two neighboring hydroponic cultivation units are hydrologically coupled to one another such that the culture solution flows top-to-bottom through each hydroponic cultivation unit on each level. The system further includes a plurality of support members, which are disposed between, and can provide mechanical support for, two hydroponic cultivation units on every two neighboring levels. The plurality of support members include at least one pipe, and each pipe is configured to arrange at least one of a hydrological connection or an electrical coupling between the two hydroponic cultivation units on the every two neighboring levels therein. The hydroponic cultivation system can achieve a vertical recycling of the culture solution.

19 Claims, 23 Drawing Sheets

(51) Int. Cl.
*A01G 7/04* (2006.01)
*A01G 31/06* (2006.01)

(58) Field of Classification Search
CPC ........ A01G 9/022; A01G 9/023; A01G 9/028; A01G 9/0295; A01G 9/047; A01G 9/20; A01G 9/26; A01G 9/249; A01G 27/006; A01G 27/02; A01G 7/045; A01G 9/045; A01G 9/1423; A01G 9/247; A01G 9/16; A01G 9/24; A47G 7/02
See application file for complete search history.

(56) References Cited

U.S. PATENT DOCUMENTS

| | | | | |
|---|---|---|---|---|
| 3,841,023 | A * | 10/1974 | Carlyon, Jr. | A01G 9/023 47/82 |
| 4,170,844 | A * | 10/1979 | Steele | A01G 9/16 47/62 R |
| 4,514,929 | A * | 5/1985 | Lestraden | A01G 9/24 47/17 |
| 9,010,022 | B2 * | 4/2015 | Brusatore | A01G 31/06 47/62 A |
| 2012/0060416 | A1 * | 3/2012 | Brusatore | A01G 31/06 47/62 A |
| 2013/0255149 | A1 * | 10/2013 | Jung | A01G 9/045 47/39 |
| 2014/0366443 | A1 * | 12/2014 | Brusatore | A01G 9/02 47/66.7 |
| 2015/0047258 | A1 * | 2/2015 | Lewis | A01G 9/023 47/66.6 |
| 2015/0107154 | A1 * | 4/2015 | Visser | A01G 9/02 47/66.6 |
| 2016/0345518 | A1 * | 12/2016 | Collier | A01G 9/143 |

* cited by examiner

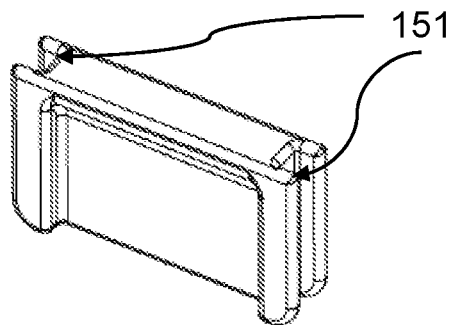
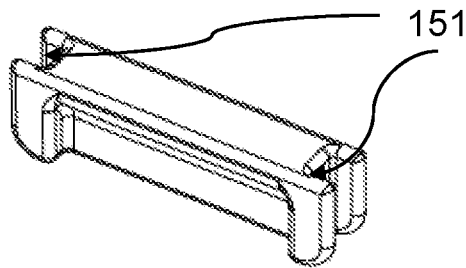
FIG. 5B FIG. 5E
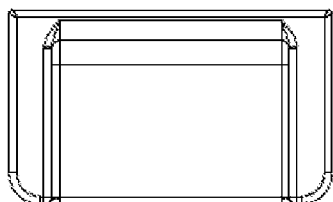
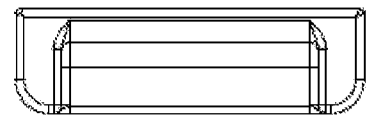
FIG. 5C FIG. 5F
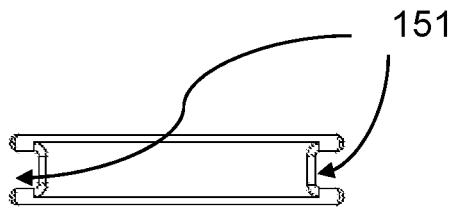
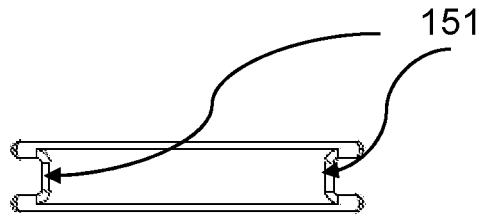
FIG. 5D FIG. 5G

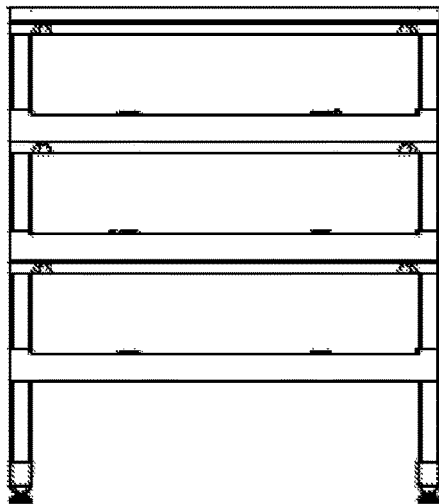
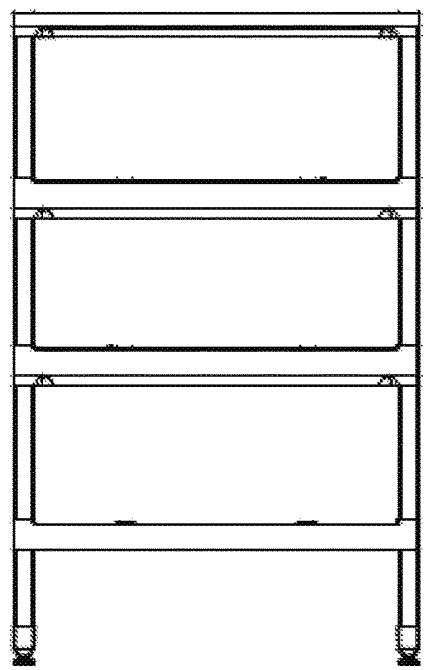
FIG. 9A     FIG. 9B
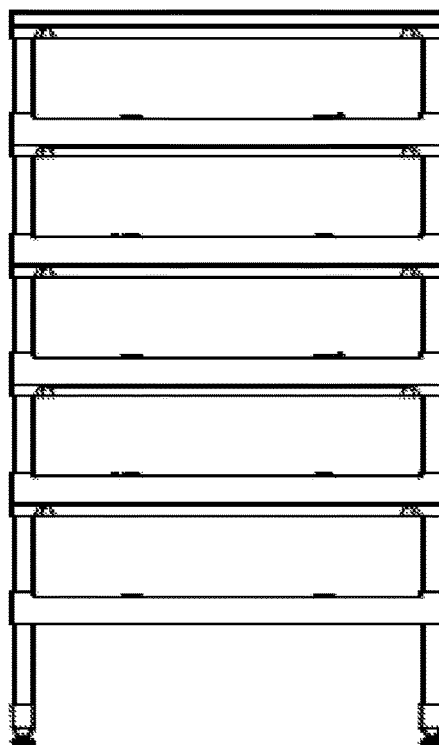
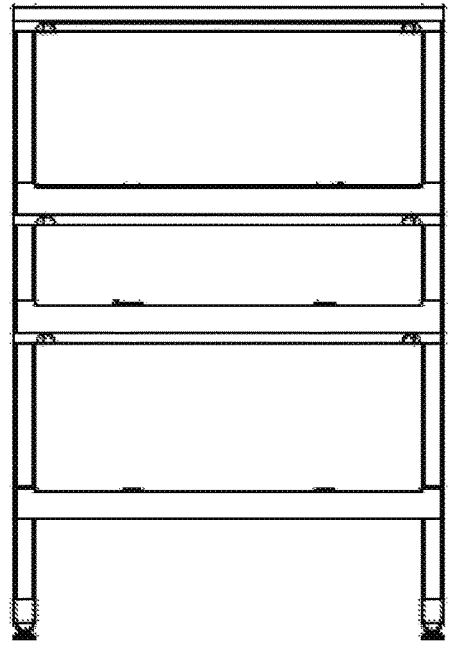
FIG. 9C     FIG. 9D

HYDROPONIC CULTIVATION UNIT AND SYSTEM

CROSS-REFERENCE TO RELATED APPLICATION

The present application is a continuation application of U.S. patent application Ser. No. 15/466,796, filed on Mar. 22, 2017, which is a continuation of, and claims priority to, PCT/CN2016/102236 filed on Oct. 15, 2016. The disclosures of these applications are hereby incorporated by reference in their entirety.

BACKGROUND

As a soilless culturing method for growing plants using mineral nutrient solutions, the hydroponic cultivation technology has been increasingly employed in plant factories to grow plants indoors using artificial lights, such as LED lamps.

SUMMARY

The inventors of the present disclosure have recognized that, in a conventional hydroponic cultivation technology, a cultivation reservoir or a cultivation tank is typically employed in a hydroponic cultivation facility.

In order to ensure an even distribution of the culture solution, a traditional shallow cultivation mode, which is commonly seen in a greenhouse, typically requires a single-level cultivation tank having a length of more than 30 meters and an inclining arrangement with a certain degree of slope. Yet for a plant cultivation facility using an artificial light to grow plants indoors, a 20 m-30 m long span of building is rarely seen, and thus difficult to be obtained, in most regular buildings. As such a multi-level plant cultivation system is generally applied.

Currently in a conventional multi-level plant cultivation system, each cultivation tank typically contains a liquid that is deeper than the shallow cultivation mode as mentioned above (i.e. a deep cultivation mode), and as such resulting in a larger load, which in turns leads to higher requirements for the bearing capability, and for the composition material as well, of the multi-level plant cultivation system.

To accommodate these above requirements, the main frame of the multi-level hydroponic cultivation system as mentioned above is typically built with metal parts, assembled typically by welding or screw fixation. In such a multi-level hydroponic cultivation system, a cultivation tank is disposed on each level of the main frame, which typically comprises a foam material having relatively good thermal insulation, and a PE film. A plant growth-compatible lamp, which is commonly independent from the cultivation tank, is disposed on each level, and typically comprises a fluorescent lamp or a light emitting diode (LED) as the plant growth-compatible light source.

Due to limited space and varied sizes of buildings, during construction and installation of the plant cultivation facilities, all the materials and compositions need on-site customization; for example, all the metal parts required for the main frame need on-site cutting, and all the film for the cultivation tanks also need on-site cutting. Additionally, welding or screwing of metal parts is needed to build the main frame; adhesive tapes, glues, etc. are needed for arrangement of PE films; and wiring and a hanging structure is also needed for mounting the LED lamps.

As such, the whole process of assembling a conventional plant cultivation facility as described above is quite complicated. Disassembling and/or maintenance of the plant cultivation facility as described above are similarly very complicated and incurs a high labor cost. In addition, the metal frame, screws and other metal parts are prone to rust over time, and the life of PE films is short, which requires replacement every 2 years or so. Furthermore, the multi-level plant cultivation facility itself may likely exceed the load-bearing requirement of a general floor of a regular building, and a multi-level cultivation system as such is difficult to be built in buildings having multiple floors.

The inventors of the present disclosure have recognized that, these issues associated with conventional plant cultivation technologies as mentioned above have greatly limited their wide application in real practice.

In order to address the issues associated with conventional plant cultivation technologies as described above, the present disclosure provides a hydroponic cultivation unit (e.g., device) and system using an artificial light. The present disclosure relates generally to the field of hydroponic culturing technologies, more specifically to a hydroponic cultivation technology for growing plants in plant factories using artificial lights, and more in particular to a hydroponic cultivation unit and system In a first aspect, a configurable hydroponic cultivation unit for cultivating plants in a continuously flowing culture solution is disclosed herein. The configurable hydroponic cultivation unit includes a tank. The tank comprises at least one separation bar and at least one removable dam member.

The at least one separation bar is disposed on a bottom side of the tank and is configured to separate the tank into a plurality of trough regions. The at least one removable dam member is configured to be removably mounted in the tank to thereby block the culture solution from flowing therethrough. The at least one separation bar and the at least one removable dam member are configured to allow a configurable passageway for the culture solution flowing in the tank.

In some embodiments of the configurable hydroponic cultivation unit, the passageway of the culture solution can be configurable. For example, the at least one separation bar and the at least one removable dam member are configured such that the culture solution flowing in the tank can take a winding passageway, and specifically can take a zigzag passageway. It is noted that besides a zigzag passageway, the culture solution can also take other winding shapes. There are no limitations herein.

In some other embodiments of the configurable hydroponic cultivation unit, the depth of the culture solution in the tank can be configurable. In this regard, the at least one removable dam member can be removably mounted before an outlet in the tank to thereby allow a configurable depth for the culture solution flowing in the tank. For example, it can be configured that the at least one removable dam member comprises at least two removable dam members of a different height.

In the hydroponic cultivation unit as described above, the at least one removable dam member can be removably mounted in the tank via a tongue-groove connection, but other types of connection are also possible. There are no limitations herein.

In a second aspect, the present disclosure provides a hydroponic cultivation unit, comprising at least one first flow-splitting bar aligned across at least one trough region of a tank. The at least one flow-splitting bar can form at least two openings across each of the at least one trough region, and is configured to split, and to thereby substantially evenly distribute, the culture solution flowing in the tank.

In some embodiments, the at least one first flow-splitting bar aligned in a trough region immediately following a turning point of a passageway of the culture solution is configured to have an increasingly bigger aperture ratio for each opening along a direction of alignment roughly same with a direction of flow of the culture solution at the turning point of the passageway. In one example, the at least one first flow-splitting bar can be configured to form three openings across the trough region, which have aperture ratios of about 5:6:8 along the direction of alignment.

Such a configuration for at least one first flow-splitting bar essentially ensures that the culture solution in the passageway can evenly flow and be evenly distributed.

In some embodiments, the hydroponic cultivation can further comprise at least one second flow-splitting bar in a last trough region which is immediately before an outlet. To ensure an even flow of the culture solution, it can be configured such that the at least one second flow-splitting bar has a smaller aperture ratio for each opening formed by the at least one second flow-splitting bar compared with the at least one first flow-splitting bar.

In a third aspect, the present disclosure further provides a hydroponic cultivation unit having least one removable dispenser, wherein: the at least one removable dispenser is removably mounted across at least one trough region of a tank and is configured to substantially evenly distribute the culture solution flowing in the at least one trough region of the tank.

In some embodiments, each of the at least one removable dispenser can be configured to be removable mounted onto at least one flow-splitting bar aligned across the at least one trough region of the tank.

In the hydroponic cultivation unit as described above, each removable dispenser can comprise at least one rectifying hole, which are arranged to run across the each removable dispenser, and each removable dispenser can also comprise or at least one rectifying indentation, arranged on a top side of the each removable dispenser.

In some embodiments of the hydroponic cultivation unit, each removable dispenser can be of a hollow structure, and the hollow structure can be provided with at least one top hole on a top side of the hollow structure and at least one side hole on a side of the hollow structure, which are configured to facilitate release of air that is trapped inside the hollow structure during flow of the culture solution in the tank to thereby prevent the each removable dispenser from floating up.

In a fourth aspect, the present provides a hydroponic cultivation unit comprising a tank. In some embodiments, the tank can be provided with a plurality of reinforcing bars on a back side opposing to a top opening of the tank. The plurality of reinforcing bars are configured such that the plurality of reinforcing bars have a denser distribution in a middle region than in a non-middle region.

In some embodiments, the plurality of reinforcing bars can be arranged in rows and columns, and can be of an integrated structure with the tank.

In a fifth aspect, the present provides a hydroponic cultivation unit comprising a filter. The filter can be removably mounted before an outlet, and is configured to retain certain solid matters while allowing the culture solution to drain out of the outlet.

It can be configured such that mounting of the filter leaves an unoccupied zone behind the filter and before the outlet, so as to effectively prevent the outlet from being blocked by the certain solid matters in the culture solution.

As such, the filter can be of a shape having a sloping side, wherein the sloping side is next to the unoccupied zone upon mounting of the filter, and the sloping side is provided with at least one filtering net of a preset mesh size, configured to retain solid matters of a size bigger than the preset mesh size.

The filter can further include a bottom side, which can also be provided with at least one filtering net of a preset mesh size. A filter as such can thus be configured to allow collection of the certain solid matters retained at the filter upon removal of the filter.

The filter can be of a trapezoid, and can further comprise a top side, which is configured to attach with a sidewall upon mounting of the filter.

In any of the embodiments of the hydroponic cultivation unit as described above, the hydroponic cultivation unit can further include a planting board, which can be removably disposed over a top opening of a tank; and the planting board is provided with a plurality of through-holes, wherein each through-hole is configured to provide a holding space for one of the plants being cultivated on the planting board.

Furthermore, the planting board can further include at least one plug, which are configured to be removably mounted on at least one through-hole to thereby alter a distribution of the plants being cultivated on the planting board.

In a sixth aspect, a hydroponic cultivation system for cultivating plants in a continuously flowing culture solution is provided herein. The hydroponic cultivation system includes at least one hydroponic cultivation unit having a tank, an inlet and an outlet. In the hydroponic cultivation system each of the at least one hydroponic cultivation unit is vertically stacked with one another to form a multi-level structure; and the culture solution can be configured to flow top-to-bottom through each of the at least one hydroponic cultivation unit on each level.

The hydroponic cultivation system can further include at least one light source. Each light source is disposed over a back side of one hydroponic cultivation unit on a first level and is configured to emit a plant-compatible light to thereby support growth of the plants being cultivated on another hydroponic cultivation unit on a second level. Herein the second level is one level lower than the first level.

In some embodiments, each of the at least one light source can specifically comprise a plant-compatible LED lamp, which is configured to emit a plant-compatible light to support growth of the plants being cultivated.

For the structure, the hydroponic cultivation system cam further include a plurality of support members. The plurality of support members are removably disposed, and are configured to provide mechanical support, between two hydroponic cultivation units on every two neighboring levels; and at least one support member connecting two hydroponic cultivation units on every two neighboring levels can comprise a pipe having a top opening, a bottom opening, and an empty inner space. The pipe is configured to provide a means for arranging at least one of a hydrological connection or an electrical coupling between the two hydroponic cultivation units on the every two neighboring levels.

In some embodiments of the hydroponic cultivation system, the pipe can be configured to provide a means for arranging a hydrological connection between the two hydroponic cultivation units on the every two neighboring levels. As such, an outlet of a first hydroponic cultivation unit on a first level is hydrologically connected with the top opening of the pipe; and the bottom opening of the pipe is hydrologically connected with an inlet of a second hydroponic cultivation unit on a second level. Herein the second level is one level lower than the first level.

The outlet of the first hydroponic cultivation unit on the first level can be hydrologically connected with the top opening of the pipe via an outlet portion of the first hydroponic cultivation unit. The outlet portion can have a lower opening, which is connected with the top opening of the first pipe; and the outlet portion can also have a side opening, which is connected to the tank of the first hydroponic cultivation unit.

In some embodiments, the lower opening of the outlet portion can be arranged on a lower protrusion, which protrudes downward from the outlet portion, and it can be configured that an outer wall of the lower protrusion is attached with an inner wall of the pipe. In some of the embodiments as described above, the outer wall of the lower protrusion is provided with a plurality of reinforcing bars, which are configured to provide a stronger means for attaching the outer wall of the lower protrusion with the inner wall of the pipe.

In some embodiments of the hydroponic cultivation system, the bottom opening of the pipe can be hydrologically connected with the inlet of the second hydroponic cultivation unit on the second level via an inlet portion of the second hydroponic cultivation unit. The inlet portion can comprise an upper opening, which is connected with the bottom opening of the pipe; a side opening, which is connected to the tank of the second hydroponic cultivation unit; and a bottom wall, which is disposed below the side opening.

In some embodiments of the hydroponic cultivation system, the upper opening of the inlet portion can be provided with a plurality of reinforcing bars, protruding from an inside wall of the upper opening and configured to function as a step for the bottom opening of pipe to stand thereon to thereby allow a hydrological connection between the pipe and the side opening of the inlet portion.

In some embodiments, the pipe is provided with a nick at a bottom end and next to the bottom opening. The nick is configured to hydrologically connect with the side opening of the inlet portion while allowing the bottom end of the pipe to attach with the bottom wall of the inlet portion.

In some embodiments of a hydroponic cultivation system as described above, the pipe can be configured to provide a means for arranging an electrical coupling between the two hydroponic cultivation units on the every two neighboring levels.

As such, in some embodiments, a main stem of a wiring circuit runs through each pipe connecting two hydroponic cultivation units on every two neighboring levels. The main stem of the wiring circuit can further run through a wiring portion in each hydroponic cultivation unit on each level.

The wiring portion can comprise: an upper opening, which is connected with a bottom opening of a first pipe; a lower opening, which is connected with a top opening of a second pipe; and a side opening. At least one of the upper opening and the lower opening can be configured to allow a first electrical connection between two segments of the main stem. The side opening can be configured to allow a second electrical connection between the main stem and a unit branch of the wiring circuit. Herein each unit branch corresponds to, and electrically connects with a plant-compatible light source of, the each hydroponic cultivation unit on each level.

The disclosure provides a hydroponic cultivation system for cultivating plants in a continuously flowing culture solution. The system includes a plurality of hydroponic cultivation units vertically stacked one over another to thereby form a multi-level structure. Each hydroponic cultivation unit is configured to provide a cultivation bed for the plants, and every two neighboring hydroponic cultivation units are hydrologically coupled to one another such that the culture solution flows top-to-bottom through each of the plurality of hydroponic cultivation units on each level. The system further includes a plurality of support members, disposed between, and are configured to provide mechanical support for, two hydroponic cultivation units on every two neighboring levels. The plurality of support members include at least one pipe, each configured to arrange at least one of a hydrological connection or an electrical coupling between the two hydroponic cultivation units on the every two neighboring levels therein.

In the hydroponic cultivation system, each hydroponic cultivation unit includes a tank. The tank includes at least one separation bar and at least one removable dam member. The at least one separation bar is disposed on a bottom side of the tank and is configured to separate the tank into a plurality of trough regions; and the at least one removable dam member is configured to be removably mounted in the tank to thereby block the culture solution from flowing therethrough. The at least one separation bar and the at least one removable dam member are configured to allow a configurable passageway for the culture solution flowing in the tank.

Each hydroponic cultivation unit can further include a planting board, which is removably disposed over a top opening of the tank. The planting board is provided with a plurality of through-holes, and each through-hole is configured to provide a holding space for one of the plants being cultivated on the planting board.

According to some embodiments of the hydroponic cultivation system, the at least one pipe comprises a first pipe, which is configured to arrange a hydrological connection between two hydroponic cultivation units on every two neighboring levels therein. An outlet of one hydroponic cultivation unit on an upper level of the every two neighboring levels is hydrologically connected with a top opening of the first pipe, and a bottom opening of the first pipe is hydrologically connected with an inlet of another hydroponic cultivation unit on a lower level of the every two neighboring levels.

The top opening of the first pipe can be securely attached with an outlet portion of the one hydroponic cultivation unit on the upper level of the every two neighboring levels to allow a hydrological connection with the outlet of the one hydroponic cultivation unit. The outlet portion is provided with a lower opening and a side opening. The lower opening is connected with the top opening of the first pipe, and the side opening is connected to a tank of the one hydroponic cultivation unit.

The outlet portion can include a lower protrusion, and the lower opening of the outlet portion can be arranged on the lower protrusion, which protrudes downward from the outlet portion. An outer wall of the lower protrusion is securely and water-tightly attached with an inner wall of an upper connection portion of the first pipe.

Herein the outer wall of the lower protrusion can be securely and water-tightly attached with the inner wall of the first pipe by means of opposing-gender threads arranged respectively on the outer wall of the lower protrusion and on the inner wall of the upper connection portion of the first pipe.

The outer wall of the lower protrusion can be provided with a plurality of reinforcing bars, which are configured to provide a strong means for attaching the outer wall of the lower protrusion with the inner wall of the first pipe.

The bottom opening of the first pipe can be securely attached with an inlet portion of the another hydroponic cultivation unit on the lower level of the every two neighboring levels to allow a hydrological connection with the inlet of the another hydroponic cultivation unit. The inlet portion can be provided with an upper opening and a side opening. The upper opening is connected with the bottom opening of the first pipe, and the side opening is connected to a tank of the another hydroponic cultivation unit. The inlet portion can accordingly comprise a bottom wall, disposed below the side opening.

An outer wall of a lower connection portion of the first pipe can be securely and water-tightly attached with an inner wall of the inlet portion of the another hydroponic cultivation unit on the lower level of the every two neighboring levels.

Herein the outer wall of the lower connection portion of the first pipe can be securely and water-tightly attached with the inner wall of the inlet portion by means of opposing-gender threads arranged respectively on the outer wall of the lower connection portion of the first pipe and the inner wall of the inlet portion.

The upper opening of the inlet portion can be provided with a plurality of reinforcing bars, protruding from an inside wall of the upper opening and configured to function as a step for the bottom opening of first pipe to stand thereon to thereby allow a hydrological connection between the first pipe and the side opening of the inlet portion.

The first pipe can be provided with a nick at a bottom end and next to the bottom opening, which is configured to hydrologically connect with the side opening of the inlet portion and to allow the bottom end of the first pipe to attach with the bottom wall of the inlet portion.

According to some embodiments, the at least one pipe comprises a second pipe, which is configured to arrange an electrical coupling between two hydroponic cultivation units on every two neighboring levels therein. The hydroponic cultivation system further comprises a wiring circuit, configured to power a plant-compatible light source disposed over each hydroponic cultivation unit on each level. The wiring circuit includes a main stem, configured to run through each second pipe connecting two hydroponic cultivation units on every two neighboring levels.

Each hydroponic cultivation unit on each level can include a wiring portion, which is provided with an upper opening and a lower opening. The upper opening is connected with a bottom opening of one second pipe immediately above the each hydroponic cultivation unit, and the lower opening is connected with a top opening of another second pipe immediately below the each hydroponic cultivation unit. The main stem of the wiring circuit is configured to run through the wiring portion in the each hydroponic cultivation unit on the each level via the upper opening and the lower opening.

Herein, the main stream of the wiring circuit can include a plurality of segments, which are detachably connected with one another by means of a pair of first connectors arranged respectively at two opposing ends of two neighboring segments. At least one of the upper opening and the lower opening of the wiring portion in the each hydroponic cultivation unit on the each level can be configured to expose one of the pair of first connectors to thereby allow a first electrical connection between the two neighboring segments.

The wiring circuit can further comprise a plurality of unit branches, which are electrically coupled to the main stem respectively. Each unit branch is configured to power a plant-compatible light source disposed over each hydroponic cultivation unit on each level. The wiring portion in the each hydroponic cultivation unit on the each level can be further provided with a side opening, and each unit branch can be electrically coupled to the main stem via the side opening.

Herein, the main stream of the wiring circuit can be provided with a plurality of short segments, each configured to be detachably connected with each of the plurality of unit branches by means of a pair of second connectors arranged respectively at a first end of one short segment distal to the main stem and a second end of one corresponding unit branch opposing to the first end. The side opening of the wiring portion in the each hydroponic cultivation unit on the each level can be configured to expose the first end of the one short segment to thereby allow a second electrical connection between the main stem and the each of the plurality of unit branches.

The plant-compatible light source disposed over each hydroponic cultivation unit on each level can comprise at least one LED lamp, each configured to be electrically coupled to one unit branch of the wiring circuit corresponding to a level immediately above the each level.

A tank of each hydroponic cultivation unit on each level comprises a sideline, wherein the sideline is provided with a plurality of slots, each corresponding to one LED lamp and configured to provide a mounting means for one unit branch corresponding the each level.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent according to these drawings.

FIG. 5B illustrates a perspective view of a removable dam member resulting in a deep cultivation mode of the hydroponic cultivation unit according to some embodiments of the present disclosure;

FIG. 5C illustrates a side view;

FIG. 5D illustrates a top view;

FIG. 5E illustrates a perspective view of a removable dam member resulting in a shallow cultivation mode of the hydroponic cultivation unit according to some embodiments of the present disclosure;

FIG. 5F illustrates a side view;

FIG. 5G illustrates a top view;

FIG. 8B is a schematic diagram of a pipe in the multi-level plant cultivation sub-system as shown in FIG. 8A;

FIG. 8C illustrates a pipe according to some other embodiments;

FIG. 8E is a schematic diagram of a pipe according to some other embodiments in the multi-level plant cultivation sub-system as shown in FIG. 8A;

FIG. 8F illustrates a pipe according to some other embodiments;

FIG. 9A illustrates a multi-level plant cultivation sub-system of a hydroponic cultivation system according to a first embodiment of the present disclosure;

FIG. 9B illustrates a multi-level plant cultivation sub-system of a hydroponic cultivation system according to some other embodiments;

FIG. 9C illustrates a second embodiment;

FIG. 9D illustrates yet some other embodiments;

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. According to the described embodiments of the disclosure, those ordinarily skilled in the art can obtain other embodiment(s), which come(s) within the scope sought for protection by the disclosure.

To address the issues associated with conventional plant cultivation technologies as described above, the present disclosure provides a hydroponic cultivation unit and system using an artificial light.

In a first aspect, a hydroponic cultivation unit is provided. The hydroponic cultivation unit comprises a tank and a planting board. The tank is configured to provide reservoir for retaining, and for allowing a continuous flow of, the culture solution therein, and is also configured to provide growth space for roots of the plants being cultivated. The planting board is disposed over a top opening of the tank, and is configured to provide holding space for the plants being cultivated in the hydroponic cultivation unit. Optionally, the hydroponic cultivation unit can further comprise at least one light blocking cover, disposed over the top opening of the tank, and configured to block light from shedding into the tank.

Figure 1:
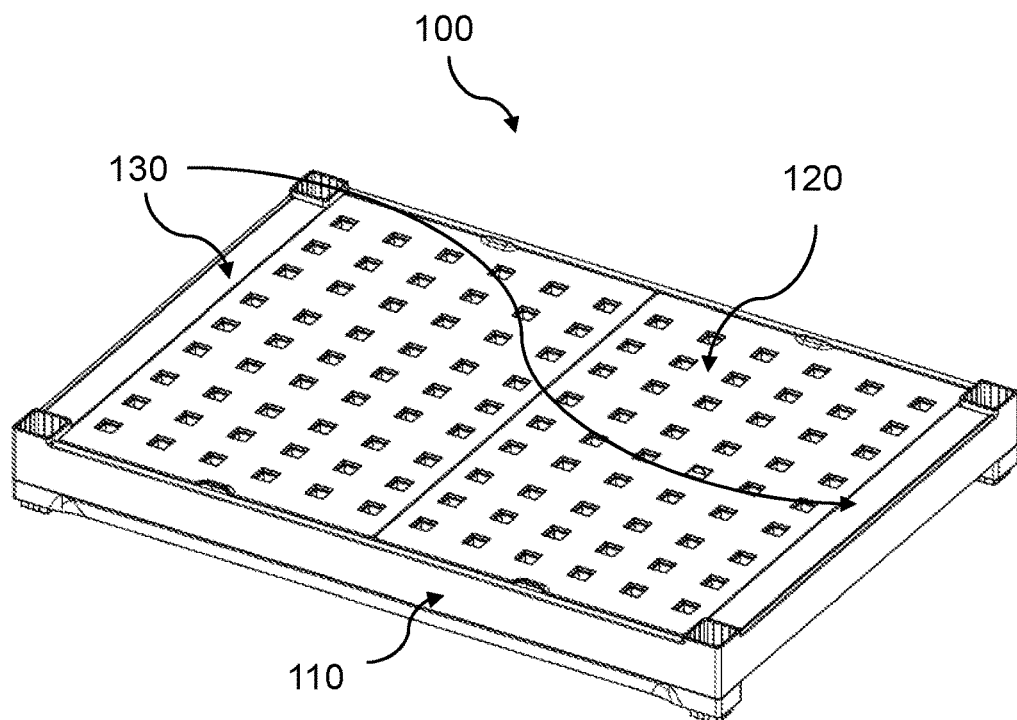
FIG. 1 illustrates a hydroponic cultivation unit according to some embodiments of the present disclosure.

FIG. 1 illustrate a hydroponic cultivation unit according to some embodiments of the present disclosure. As shown in FIG. 1, the hydroponic cultivation unit 100 comprises a tank 110, a planting board 120, and a pair of light blocking covers 130. The planting board 120 and the pair of light blocking covers 130 are disposed over, and attached securely to, the top opening of the tank 110, and the pair of light blocking covers 130 are disposed respectively on an opposing side of the planting board 120.

The hydroponic cultivation unit 100 takes a shape of a rectangle, which has a length of ≤1.5 m and a width of ≤1 m. Because of the relatively small size of the hydroponic cultivation unit 100, it can be advantageous in road transportation and moving through a regular door of a regular building.

It should be noted that besides the shape of a rectangle, the hydroponic cultivation unit 100 may take other shapes, such as a square, a circle, a hexagon, etc. There are no limitations herein.

It is further noted that the light blocking covers 130 are optional and may vary in number, size, and shape, depending on the configuration of the planting board 120, as long as the light blocking covers 130 and the planting board 120 together can effectively block light from shedding into the tank to thereby prevent algae from growing in the tank of the hydroponic cultivation unit.

FIGS. 2A, 2B, 2C and 2D illustrate a perspective view, a top view, a bottom view, and a side view of the tank 110 in the hydroponic cultivation unit 100 according to the embodiment as described above.

As shown in the figures, the tank 110 substantially comprises a bed 111 (i.e. bottom wall opposing to the top opening of the tank), which is encircled by four sidewalls 112, 113, 114, and 115. The bed 111 and the four sidewalls 112, 113, 114, and 115 of the tank 110 together form a reservoir for retaining, and for allowing a flow of, the culture solution therein to support the growth of plants being cultivated in the hydroponic cultivation unit 100.

Figure 2A:
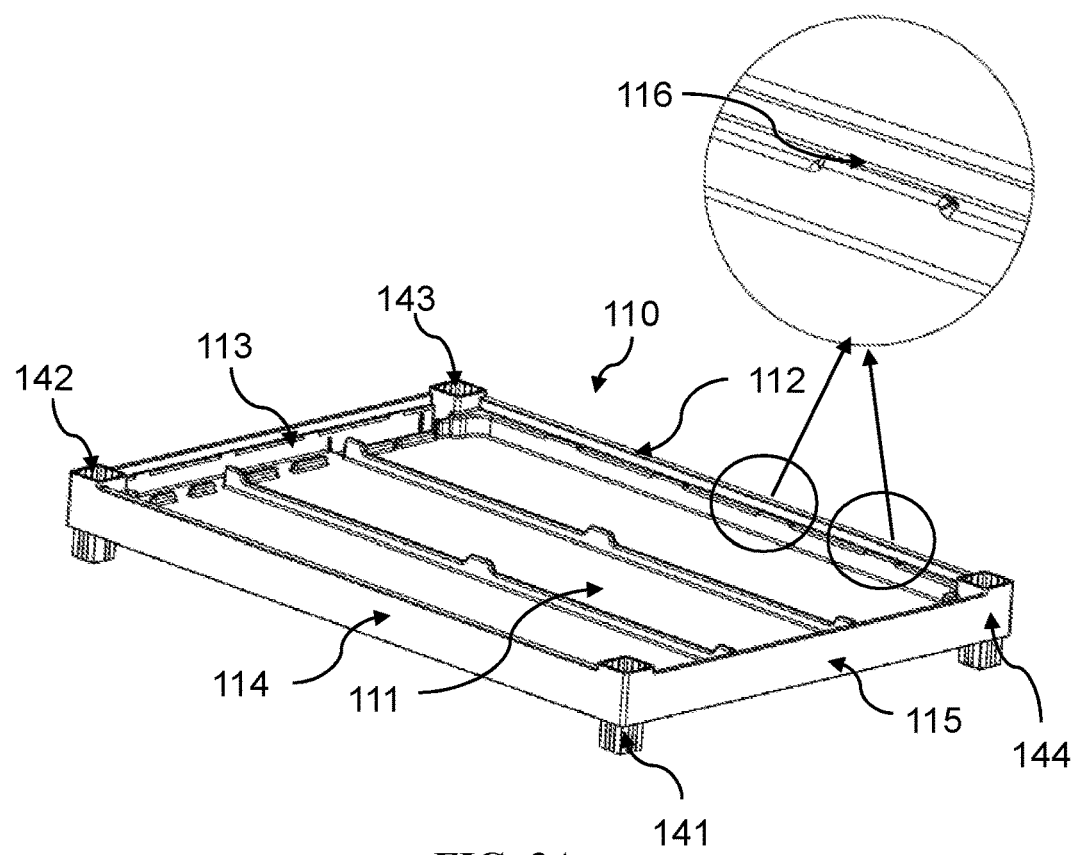
FIG. 2A is a perspective view of a tank in the hydroponic cultivation unit according to some embodiments of the present disclosure.
Figure 2B:
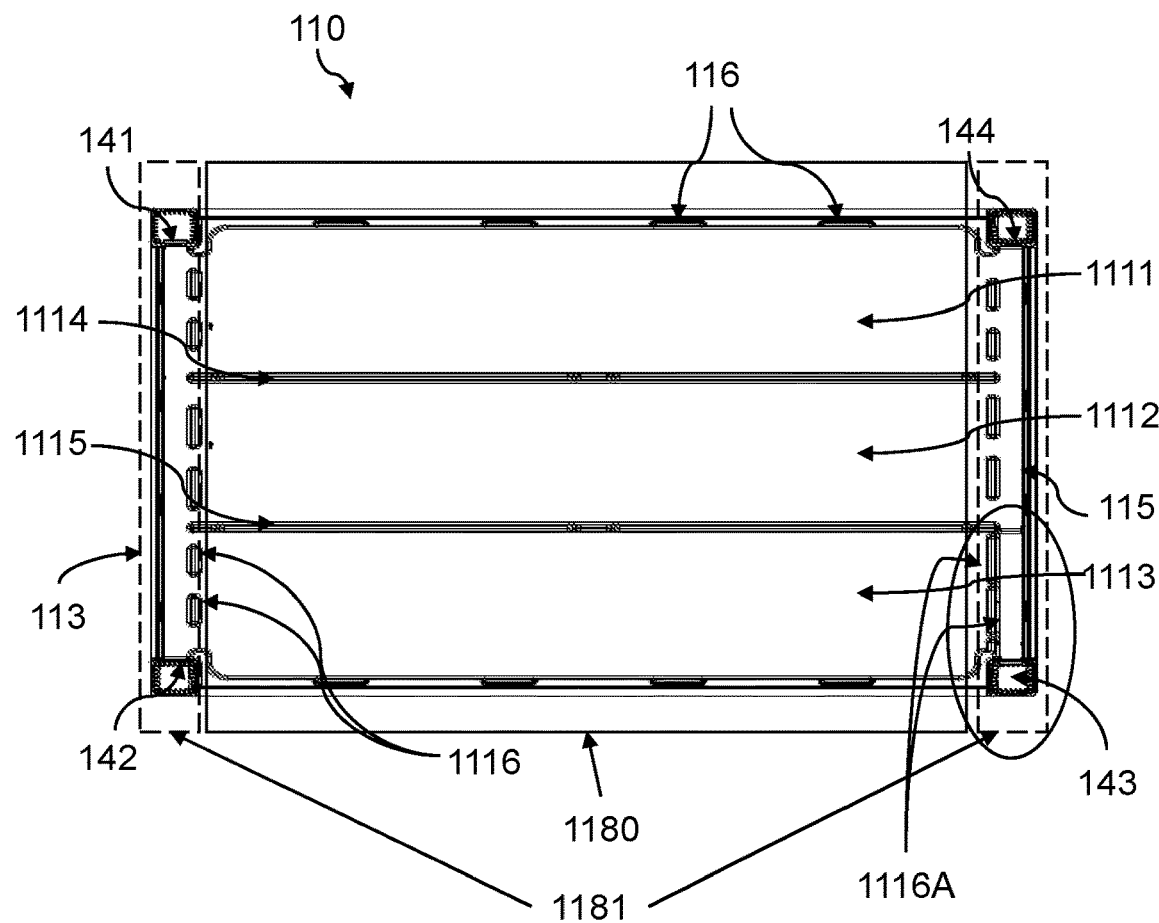
FIG. 2B is a top view.

As shown in FIG. 2B, the whole tank 110 can be divided into one cultivation region 1180 and two channel regions 1181, arranged around the two opposing sides 113 and 115 of the tank 110 respectively. The cultivation region 1180 is configured to be covered with a planting board 120 (as detailed below). Each of the channel regions 1181 is configured to provide a channel for the culture solution to flow in the tank 110, and can be provided with other functional members such as flow-splitting bars 1116, mounting structure for removable dam members 150, etc. The channel regions 1181 can also bring convenience for collecting unwanted matters and observing the culture solution in the tank 110.

On the top opening of the tank 110, a plurality of protruding bars 116 are arranged to protrude from each of the sidewalls 112, and 114. These protruding bars 116 are configured to provide a mounting means and a sliding means for a planting board 120 (also illustrated below in FIGS. 7F, 7G, and 7H).

As shown in FIG. 2B, the tank 110 of the hydroponic cultivation unit 100 is provided with three trough regions 1111, 1112, and 1113 extending from left to right of the bed 111 of the tank 110, which are separated by two separation bars 1114 and 1115 arranged on an upper surface of the bed 111 of the tank 110 in the hydroponic cultivation unit.

Each of the three trough regions 1111, 1112, and 1113 is configured to provide a passageway, or a channel, for the stream of the culture solution to flow in the tank 110. Because roots of the plants being cultivated in the hydroponic cultivation unit are typically submerged in the culture solution, each of the three trough regions 1111, 1112, and 1113 thus also provides a root-growing zone for the plants being cultivated.

In order to ensure an even distribution of the flow in, and at turns of, the passageway of the culture solution, each of the three trough regions 1111, 1112, and 1113 is further provided with a plurality of flow-splitting bars 1116, disposed in a channel region 1181 and at a position opposing to the side wall 113 and 115. The plurality of flow-splitting bars 1116 are short bars spaced apart from each other and are aligned in a direction perpendicular to the passageway. The flow-splitting bars 1116 are configured to split the flow to thereby evenly distribute the flow of the culture solution.

Depending on the practical needs, the sizes of each flow-splitting bar, the distances between each two flow-splitting bar, and the locations of the flow-splitting bars can be adjusted to ensure a good distribution effect on the flow of the culture solution in the tank.

In addition, these plurality of flow-splitting bars 1116 can further function as anchors for mounting other functional parts (e.g. removable dispensers 160, as illustrated below in FIGS. 3A and 3B) in the hydroponic cultivation unit.

It is noted that in the hydroponic cultivation unit as described above, the way by which the separation bars 1114 and 1115 separate the bed 111 of the tank 110 to thereby form the three trough regions 1111, 1112, and 1113 represents only one illustrating embodiment, and in real practice, the separation bars can be of variable numbers, lengths, orientations, and heights. There are no limitations herein.

In addition, the separation bars 1114 and 1115 can be separate parts that are independent from the tank 110, and can be mounted securely and water-tightly to an upper surface of the bed 111 of the tank 110 according to some embodiment of the hydroponic cultivation unit in the present disclosure. In a preferable embodiment, the separation bars 1114 and 1115 can be integrated portions of the tank 110, which protrude from the upper surface of the bed 111 of the tank 110 in the hydroponic cultivation unit.

Figure 2C:
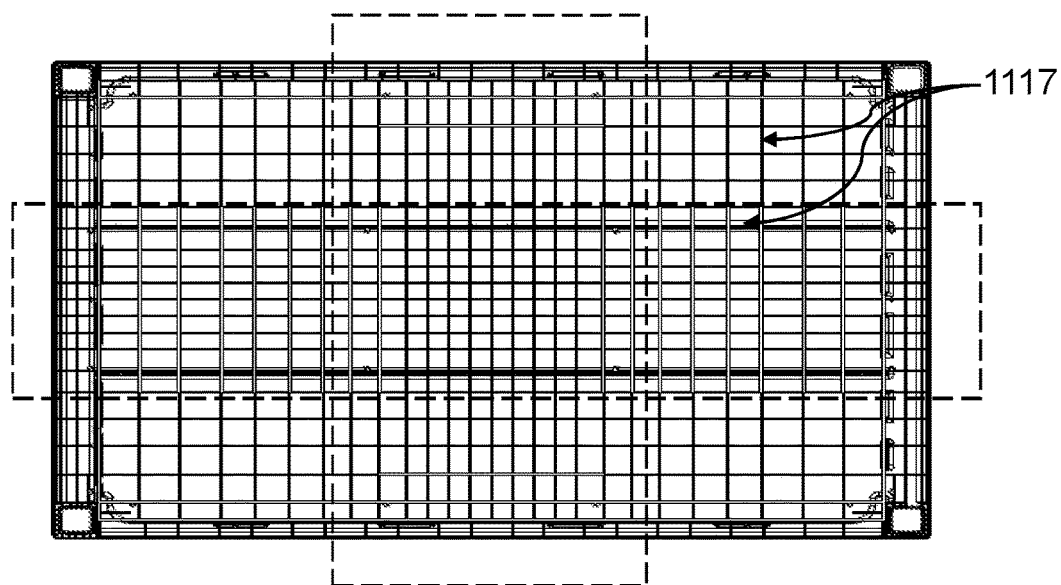
FIG. 2C is a bottom view.

As shown in FIG. 2C, the bottom surface of the tank 110, which is opposing to the top opening of the tank 110, is provided with a plurality of reinforcing bars 1117, aligned in a length direction and in a width direction and configured to reinforce the structure of the tank 110 to keep the deformation from happening. Furthermore, given the distribution of weight of the hydroponic cultivation unit, reinforcing bars 1117 are configured to have a denser distribution in the middle regions (illustrated in the rectangles having dashed lines in FIG. 2C) than in other regions (for example, the side regions along the length direction and/or along the width direction).

Besides the embodiment as illustrated in FIG. 2C, the plurality of reinforcing bars 1117 can have other sizes, alignment, distributions, and configurations depending on practical needs. There are no limitations herein.

As shown in FIG. 2B, the rectangular tank 110 further comprise four corner portions 141, 142, 143, and 144, configured to arrange an inlet and an outlet for the culture solution flowing in the tank 110, and to provide housing for pipes mechanically and hydrologically connecting the tank 110 of the hydroponic cultivation unit.

Each of the four corner portions 141, 142, 143, and 144 is configured to have an upper opening 1118 and a lower protrusion 1119 (marked in only one corner portion in FIG. 2D, for simplicity), corresponding to a top opening and a bottom side of the tank 110 respectively. The upper opening 1118 is configured to provide a space for mounting a pipe 310 (as shown in FIG. 8) by attaching the inner wall of the upper opening 118 with the outer wall of the pipe 310. The lower protrusion 1119 is configured to provide a space for mounting a pipe 310 (as shown in FIG. 8) by attaching the outer wall of the lower protrusion 1119 with the inner wall of the pipe 310.

The upper opening 1118 and the lower protrusion 1119 have equal sizes among the four corner portions, and an upper opening 1118 is configured to have a wider size than a lower protrusion 1119 such that each of the upper openings of the tank of a first hydroponic cultivation unit can hold each of the lower openings of the tank of a second hydroponic cultivation unit to thereby allow the stacking of multiple tanks (FIG. 2E) or multiple hydroponic cultivation units (FIG. 2F), providing convenience for storage and transportation.

Figure 2D:
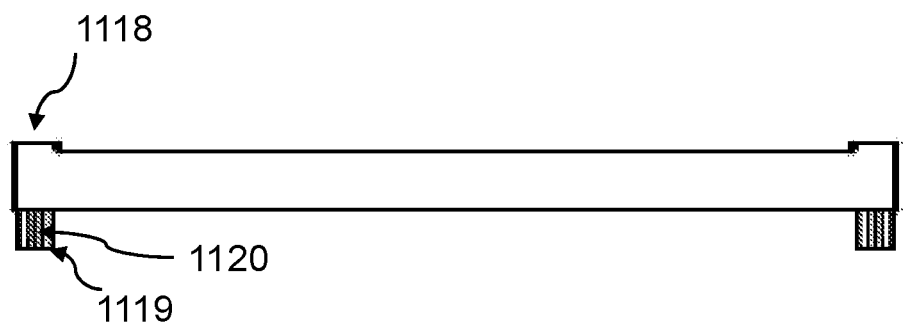
FIG. 2D is a side view.
Figure 2E:
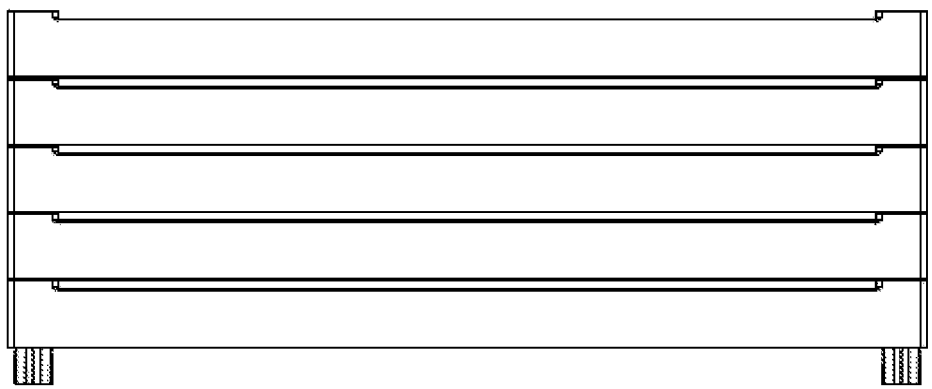
FIG. 2E is a schematic diagram illustrating the effects of stacking multiple tanks.
Figure 2F:
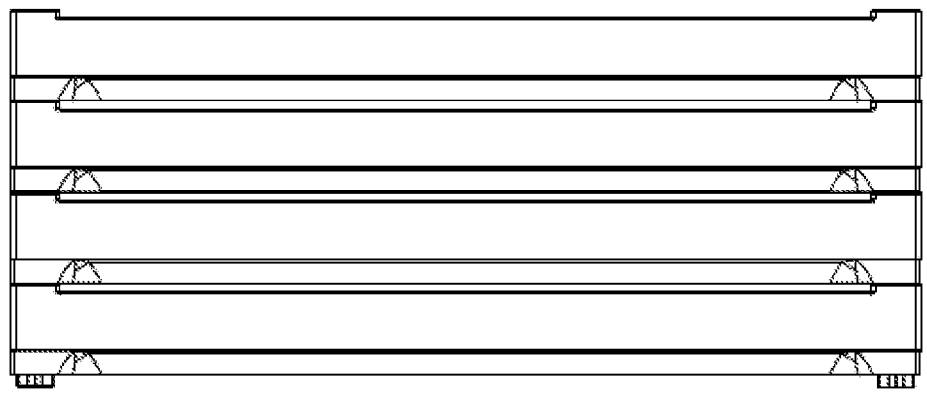
FIG. 2F is a schematic diagram illustrating the effects of stacking multiple hydroponic cultivation units.

In addition, to reinforce the corner portions and to further provide a stronger and more convenient mounting means for attaching the corner portions with connecting pipes, the inside wall of the upper opening 1118 and the outside wall of the lower protrusion 1119 are both provided with a plurality of reinforcing bars 1120, as illustrated in FIG. 2D.

Among the four corner portions 141, 142, 143 and 144, two corner portions are specifically used as an inlet and an outlet of the tank 110 of the hydroponic cultivation unit respectively, and one other corner portion can be used for wiring.

In one embodiment as disclosed herein, a first corner portion 141 and a second corner portion 143, which are disposed opposing to each other in the tank 110, are configured as an inlet or an outlet for the tank 110 of the hydroponic cultivation unit 100, respectively. The culture solution is configured to flow into the tank 110 of the hydroponic cultivation unit 100 via the inlet 141, and to drain out of the tank of the hydroponic cultivation unit via the outlet 143. Thus the two corner portions can be the inlet portion 141 and the outlet portion 143. The tank 110 of the hydroponic cultivation unit 100 can further comprise a third corner portion, or a wiring corner portion 142, configured for electrical wiring. Other embodiments with the assignment for use as the inlet, the outlet, and the wiring for the four corner portions 141, 142, 143 and 144 are also possible.

It is noted that in the embodiment as mentioned above, the main body of the tank 110 of the hydroponic cultivation unit 100, which includes the bed 111, the four sidewalls 112, 113, 114, and 115, the separation bars 1114 and 1115, and the four corner portions 141, 142, 143, and 144, can be of an integrated structure. The integrated structure of the main body of the tank 110 can have a composition of a polymer (e.g. ABS), and can thus be conveniently manufactured by injection-molding. The hydroponic cultivation unit manufactured as such has advantages including a light weight, a strong structure, and a long operational life, etc., and in addition, the issues of breaking and leakage during normal operations can be effectively avoided.

The hydroponic cultivation unit as described above can further include at least one removable dam member, which can be securely mounted at certain regions inside the tank (for example, at a region between one end of a separation bar and a side wall) and is configured to block the culture solution from flowing therethrough to thereby adjust the passageway, and the depth as well, of the culture solution flowing in the tank of the hydroponic cultivation unit.

Because the arrangement of a removable dam member can serve a role of a dam to block the culture solution from flowing therethrough, these removable dam members and the separation bars together can determine the passageway of the culture solution flowing in the tank of the hydroponic cultivation unit.

Figure 3A:
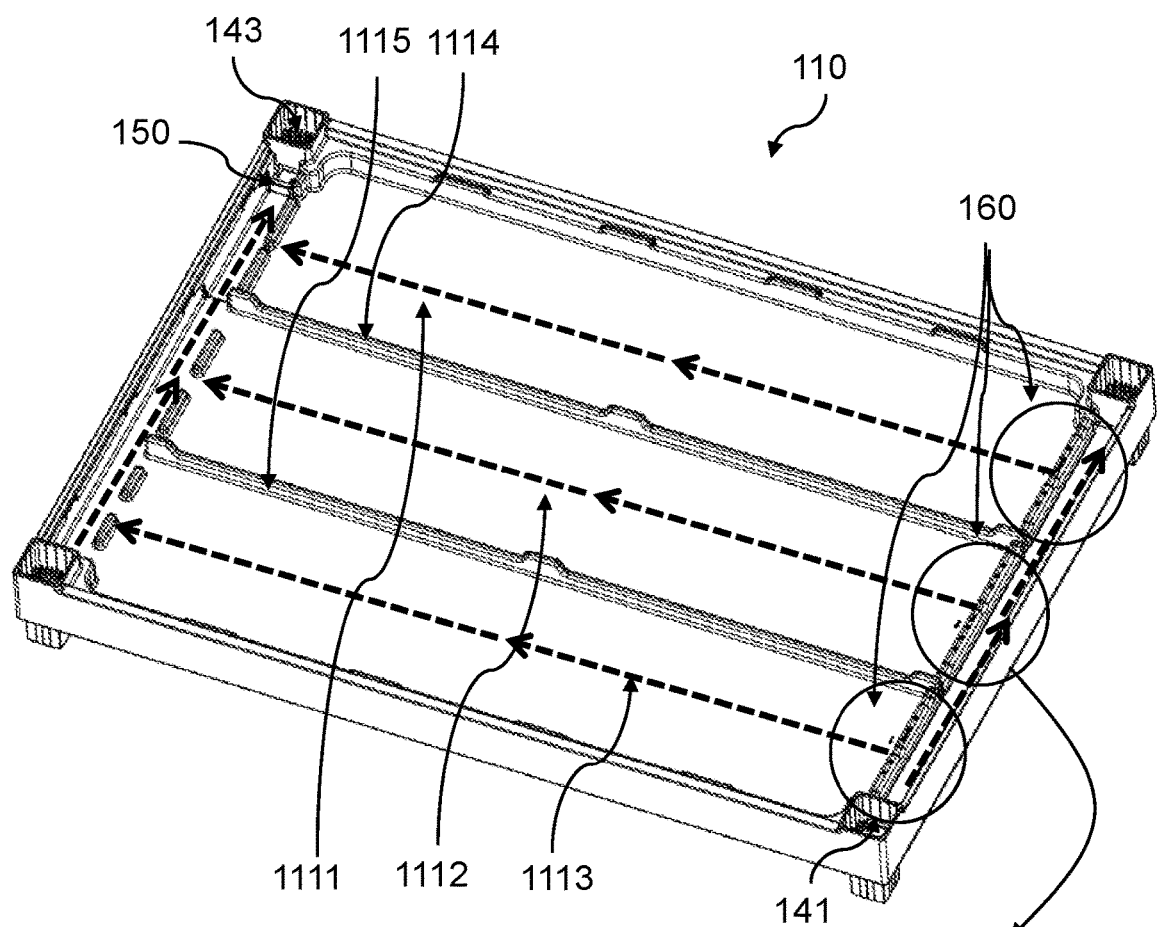
FIG. 3A illustrates one configuration of the hydroponic cultivation unit resulting in an E-shaped passageway of the culture solution flowing in the tank according to some embodiments of the present disclosure.

In one embodiment as shown in FIG. 3A that employs no removable dam member, the culture solution that flows into the tank 110 from the inlet of the inlet portion 141 can take an E-shaped passageway before it flows out of the tank 110 through the outlet of the outlet portion 143.

Figure 4A:
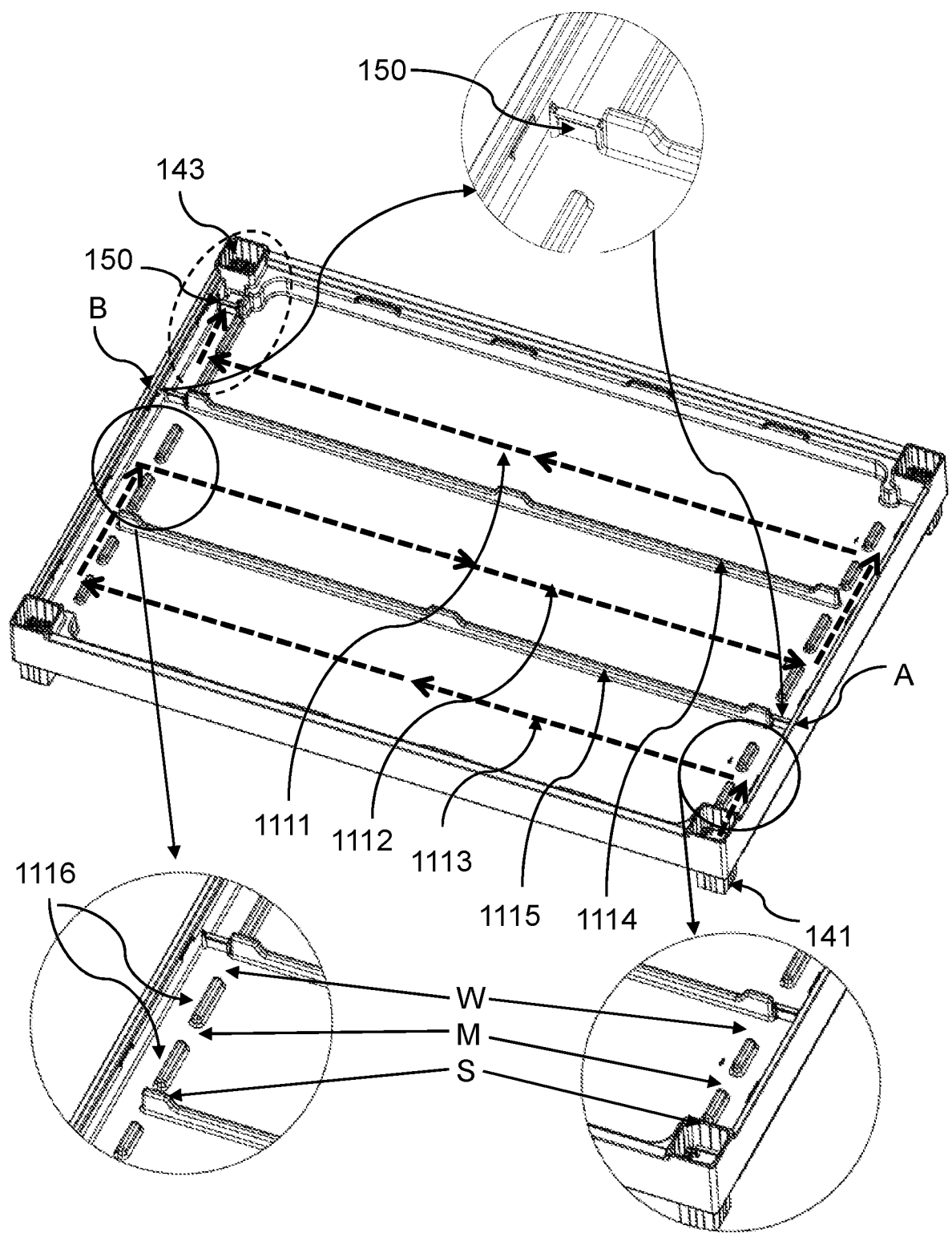
FIG. 4A illustrate a second configuration of the hydroponic cultivation unit resulting in an S-shaped passageway of the culture solution flowing in the tank according to some other embodiments of the present disclosure.

In another embodiment as shown in FIG. 4A, by securely mounting two removable dam members 150 (detailed below and shown in FIG. 5B-5G) at position A and position B of the tank of the hydroponic cultivation unit, the culture solution that flows into the tank from the inlet of the inlet portion 141 can take an S-shaped passageway before it flows out of the tank 110 through the outlet of the outlet portion 143. Specifically, in the embodiment as shown in FIG. 4A, by means of the two separation bars 1114 and 1115 and the two removable dam members 150 mounted at position A and position B, the three trough regions 1111, 1112, and 1113 together form the S-shaped passageway for the flow of culture solution in the tank, which starts at the inlet portion 141 and ends at the outlet portion 143.

As mentioned above, in order to ensure an even flow of culture solution along the passageway, a plurality of flow-splitting bars 1116, which are spaced apart from one another and aligned in a direction perpendicular to each trough region, are disposed in each of the channel regions of the tank and are configured to split the flow of culture solution.

Considering the hydrodynamics of the culture solution flowing from the inlet portion 141, along the S-shaped passageway in the tank, and to the outlet portion 143, the flow-splitting bars 1116 disposed at each turn of each trough region can be configured to have an increasingly wider opening along the direction of flow at the turning point, as illustrated in FIG. 4A. In the embodiment as shown in the figure, along the direction of flow, the three openings separated by the two flow-splitting bars 1116 have aperture ratios of about 5:6:8 (corresponding to "W", or wide; "M", or medium, and "S", or small, respectively), to ensure a relatively even flow of the culture solution passing through the turn from the channel to the trough region.

Figure 4B:
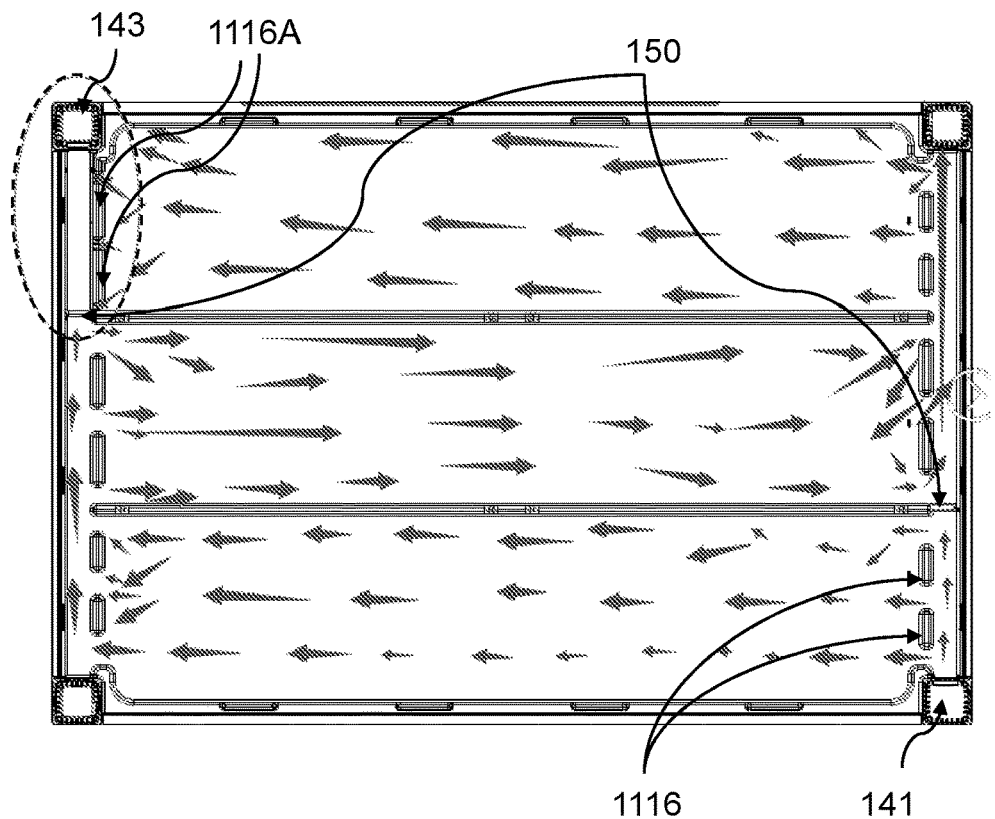
FIG. 4B illustrates a hydrodynamics of the configuration in FIG. 4A.

In addition, as shown in FIG. 4B, which illustrate the hydrodynamics of the culture solution flowing from the inlet portion 141, along the S-shaped passageway in the tank, and to the outlet portion 143, a set of wider flow-splitting bars 1116A (compared with the flow-splitting bar 1116 in other locations), are arranged at the end of the last trough region in the passageway immediately before the outlet portion 143 (enclosed by an oval with a dashed line), which ensure narrowed openings for the flow of culture solution. The arrangement of flow-splitting bars 1116A having narrower openings as such can further ensure the even flow of the culture solution in the tank to in turn ensure a sufficiently even distribution of nutrients to the roots of plants being cultivated in the hydroponic cultivation unit.

It is noted that besides the above embodiment that realizes the S-shaped passageway for the culture solution, other embodiments may be able to realize a similarly zigzag passageway for the culture solution in the tank 110.

For example, in ways similar to the combination of the parallel-arranged separation bars 1114 and 1115 and the two removable dam members 150 mounted at positions A and B as described above and illustrated in FIG. 4A, a hydroponic cultivation unit may comprise m (m=2, 4, 6, 8, . . . ) parallel-arranged separation bars and correspondingly m removable dam members that are each mounted at one alternate end of each of the separation bars to securely attach with a corresponding sidewall of the tank. As such the hydroponic cultivation unit can form n (n=3, 5, 7, 9, . . . ) trough regions in the tank, and the culture solution flowing from the inlet portion 141 can thus flow along the zigzag passageway in the tank 110 to ultimately flow out of the outlet portion 143.

Figure 4C:
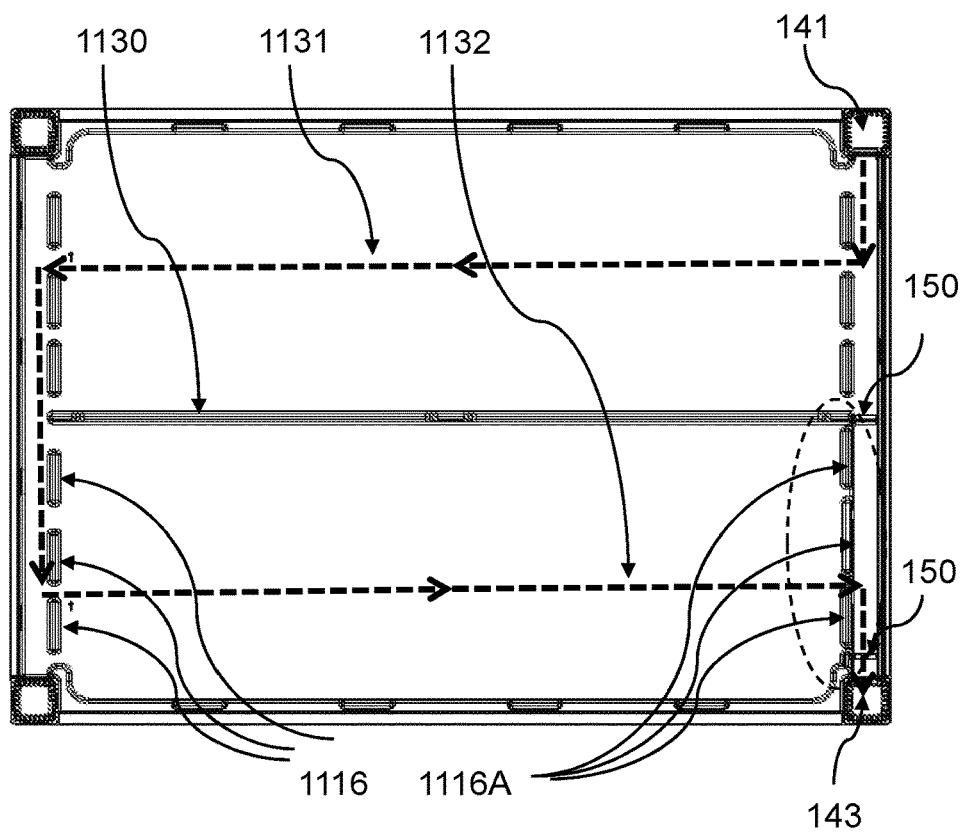
FIG. 4C illustrates a third configuration, and a hydrodynamics thereof, of the hydroponic cultivation unit resulting in an S-shaped passageway of the culture solution flowing in the tank according to some other embodiments of the present disclosure.

In another embodiment as shown in FIG. 4C, an inlet portion 141 and an outlet portion 143 are arranged on a same side. By arranging one separation bar 1130 on the bottom surface of the tank and by securely mounting one removable dam member 150 between the separation bar 130 and the sidewall connecting the inlet portion 141 and the outlet portion 143, the hydroponic cultivation unit as such can form two trough regions 1131 and 1132 in the tank, and the culture solution flow in the tank of the hydroponic cultivation unit can thus also take a zigzag passageway, as shown by the dashed arrow in FIG. 4C. Similarly, as in FIGS. 4A and 4B, a set of wider flow-splitting bars 1116A (compared with the flow-splitting bar 1116 in other locations), can be arranged at the end of the last trough region in the passageway immediately before the outlet portion 143 (enclosed by an oval with a dashed line) to ensure the even flow of the culture solution in the tank.

Similarly, a hydroponic cultivation unit may comprise m (m=1, 3, 5, . . . ) parallel-arranged separation bars and correspondingly m removable dam members that are each mounted at one alternate end of each of the separation bars to securely attach with a corresponding sidewall of the tank. As such the hydroponic cultivation unit can form n (n=2, 4, 6, . . . ) trough regions in the tank, and the culture solution flowing from the inlet portion 141 can thus flow along the zigzag passageway in the tank 110 to ultimately flow out of the outlet portion 143.

In addition, it should be further noted that the passageway of the culture solution flowing in the tank of the hydroponic cultivation unit may take a winding shape other than an S shape or a zigzag shape, such as that similar to a maze, by combination of separation bars of different orientations and removable dam members at different locations. There are no limitations herein.

It should be further noted that the more the trough regions of the S-shaped or zigzag-shaped passageway (or the more segments of the winding passageway in other embodiments), the less the flow of the culture solution recycling in the tank of the hydroponic cultivation unit, and the smaller the power that is required for the pump to recycle the culture solution. As such, by arranging more trough regions (or segments) in the passageway of the culture solution flowing in the tank, the hydroponic cultivation unit can be more energy-efficient during operation.

In order to ensure an even distribution of the culture solution during its flow in the passageway of the tank, the hydroponic cultivation unit can further include at least one removable dispenser 160, disposed across the passageway of the tank. Each removable dispenser 160 substantially comprises a bar 161 having a plurality of rectifying indentations 162, arranged on a top side of the bar 161. Such a configuration allows the removable dispenser 160 to be able to rectify, and thereby to evenly distribute, the flow of the culture solution. Besides this design, each removable dispenser can comprise a plurality of rectifying holes for the similar function in some other embodiments, whose description is skipped herein.

Each removable dispenser 160 can be of a hollow structure, and can be configured to be removably mounted on the plurality of flow-splitting bars 1116 (as illustrated in FIG. 2B) across the passageway of the tank during deployment. A plurality of top holes 163 are arranged on a top side of the hollow structure 161, and a plurality of side holes 164 are arranged on a side of the hollow structure 161. They are configured to facilitate the release of the air trapped inside the hollow structure 161 of the removable dispenser 160 during flow of the culture solution in the tank so as to prevent the floating up of the removable dispenser 160.

Figure 3B:
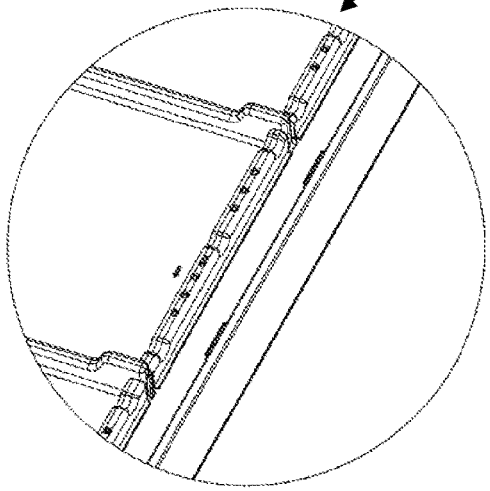
FIG. 3B illustrates a structure of a removable dispenser used in the hydroponic cultivation unit having the configuration shown in FIG. 3A according to some embodiments of the present disclosure.
Figure 3B:
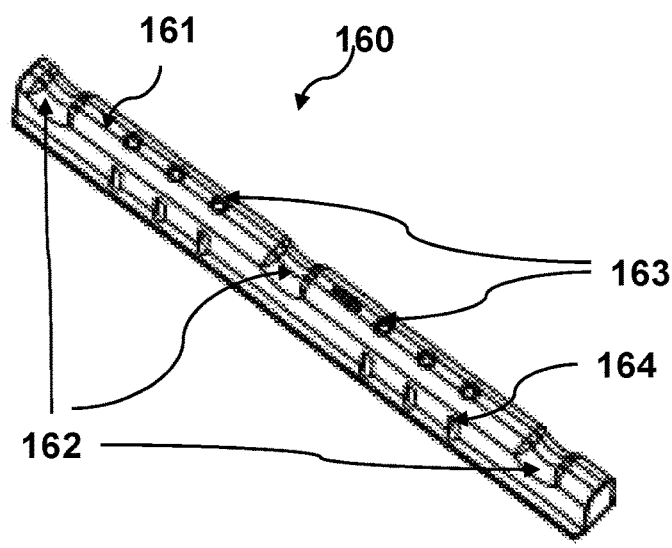

The following should be noted. There are various types of the removable dispenser 160 possible having different configurations of the rectifying holes and top holes, and multiple mounting methods are also possible. Only one embodiment is illustrated in FIG. 3B, and description of other embodiments of the removable dispenser are skipped herein.

Because a height of a removable dam member 150 mounted at position C of the tank that is immediately next to the outlet portion 143 can determine a depth of the culture solution flowing in the tank 110 of the hydroponic cultivation unit, different cultivation conditions having different depths of culture solutions can be readily realized by mounting a removable dam member 150 of different heights at position C (such outlet-located removable dam member is marked as 150A for differentiation with the removable dam members 150 at other locations).

Figure 5A:
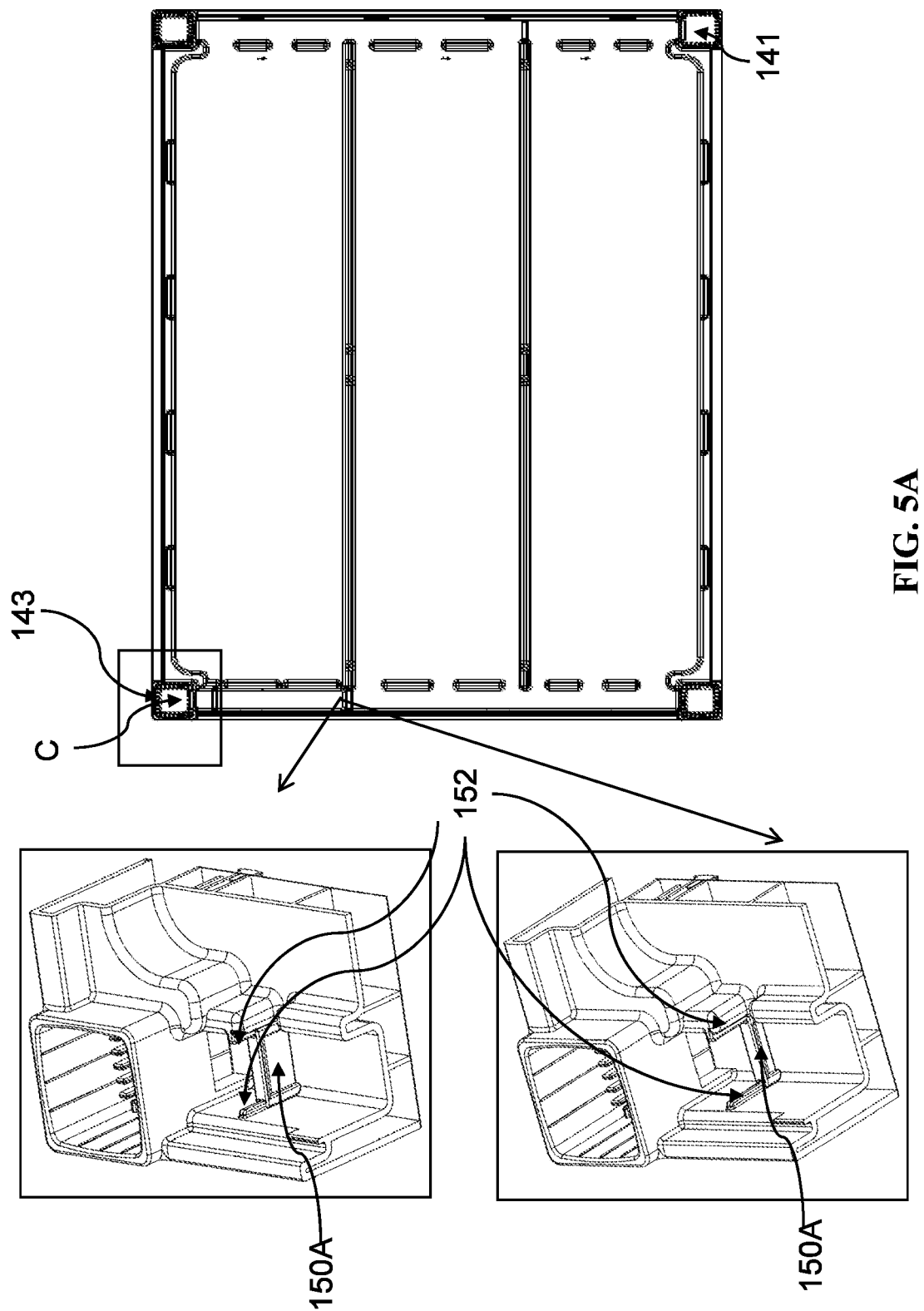
FIG. 5A illustrates two different configurations of the hydroponic cultivation unit resulting in a deep cultivation mode and a shallow cultivation mode.

In one embodiment as illustrated in FIG. 5A, one removable dam member 150A of 25 mm high (as detailed in FIGS. 5B-5D) can be securely mounted at position C to achieve a deep cultivation mode (illustrated in the upper box in FIG. 5A), which can be used specifically for the germination stage of the plants. In another embodiment also as illustrated in FIG. 5A, a removable dam member 150A of 12 mm high (as detailed in FIGS. 5E-5G) can be securely mounted at position C to achieve a shallow cultivation mode (illustrated in the lower box in FIG. 5A), which can be used specifically for the post-germination stages of the plants.

As such, by using a removable dam member 150A of 25 mm or 12 mm, selection of the deep cultivation mode or the shallow cultivation mode, as well as a switch between these two cultivation modes can be readily realized using the same hydroponic cultivation unit 100 as disclosed herein.

Mounting of the removable dam member 150A onto the mounting position C in the tank 110 can be realized by a tongue and groove design as illustrated FIGS. 5A-5G in the embodiments as mentioned above, wherein two sides of the removable dam member 150A are provided with two grooves 151, and two tongues 152 are respectively arranged on the tank at the mounting position C. However, this only represents one embodiment, and other mounting manners are also possible.

Figure 6A:
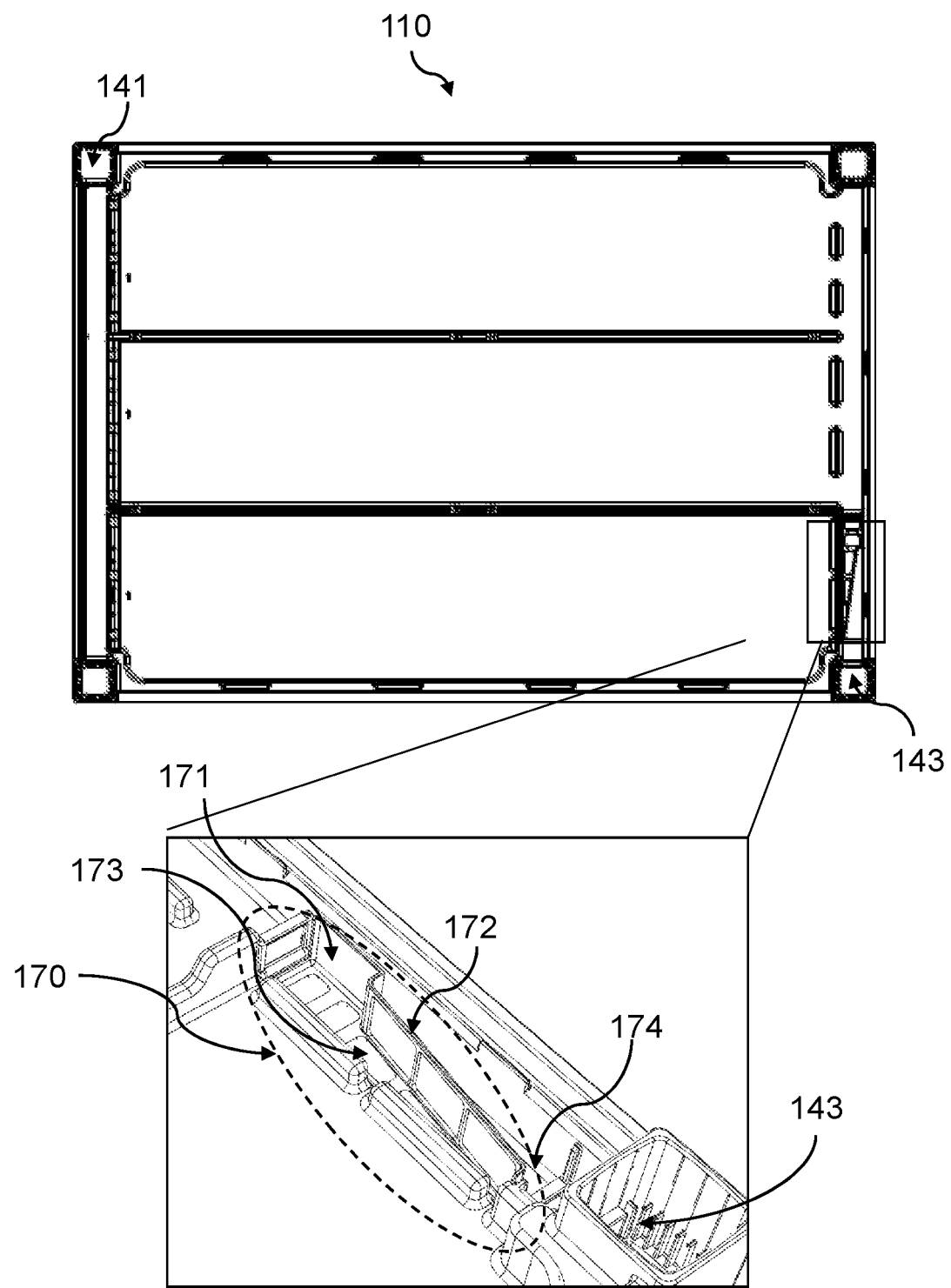
FIG. 6A illustrates a filter utilized in a hydroponic cultivation unit according to some embodiments of the present disclosure.
Figure 6B:
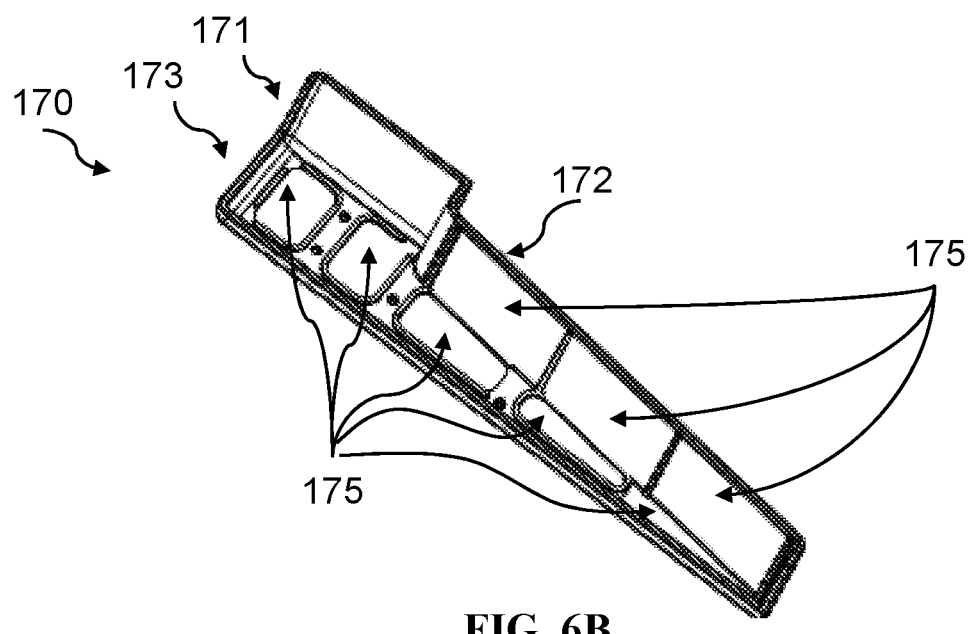
FIG. 6B is a perspective view of the filter as shown in FIG. 6A according to some embodiments of the present disclosure.
Figure 6C:
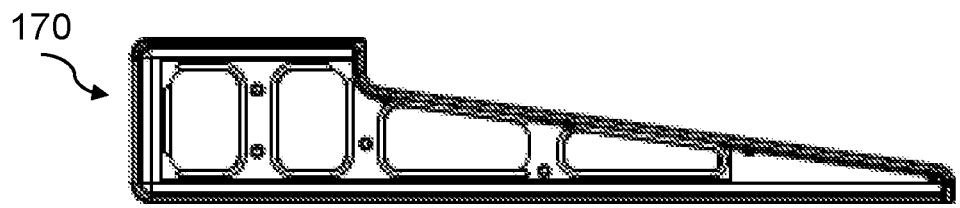
FIG. 6C illustrates a top view.
Figure 6D:
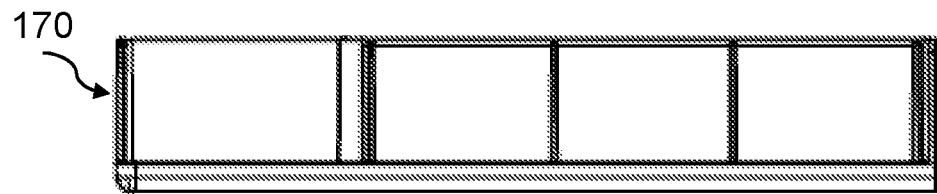
FIG. 6D illustrates a side view.

In some embodiments of the present disclosure as shown in FIG. 6A, the hydroponic cultivation unit can further comprise a filter 170, whose perspective view, top view and side view are respectively illustrated in FIG. 6B, FIG. 6C, and FIG. 6D.

As shown in FIG. 6A, the filter 170 can be disposed in a channel region of the tank 110 that is immediately before the outlet portion 143, and is configured to retain unwanted matters at the filter to thereby prevent these unwanted matters from entering the culture solution being recycled. These unwanted matters may include root tips separated from the main roots of the plants being cultivated, and may also include the matters secreted from the roots, or other particles beyond certain sizes.

As shown in FIGS. 6A and 6B, the filter 170 can have a shape of a right-angled trapezoid having a first side 171, a second side 172, and a bottom side 173, wherein the first side 171 and the second side 172 are at a right angle (90°) with the bottom side 173, and a second side 172 is on a sloping side of the trapezoid. The filter 170 is disposed in the channel region immediately before the outlet portion 143 such that the bottom side 173 attaches with the bed of the tank 110, the first side 172 attaches with a sidewall of the tank, and the second side 173 runs across the channel region to leave an unoccupied zone 174 between the filter 170 and the outlet portion 143. The second side 172 of the filter 170 is provided with at least one filtering net 175, which has a preset mesh size.

The shape of the filter 170 and its configuration in the tank of the hydroponic cultivation unit as such can thus retain the unwanted matters of sizes bigger than the preset mesh size of the filtering net 175 from the flow of the culture solution at the filter 170, while still allowing the rest of the culture solution to pass therethrough the second side 172 into the unoccupied zone 174 before draining out of the outlet portion 143. The presence of the unoccupied zone 174 can effectively prevent the outlet from being blocked by the unwanted matters in the culture solution.

Optionally, the bottom side 173 is also provided with at least one filtering net 175, similarly as the second side 172. This configuration allows a convenient collection of unwanted matters retained at the filter 170 during normal maintenance of the cultivation using the hydroponic cultivation unit.

It is noted that the filter 170 as described above represents only one embodiments, and in practice, the filter 170 can have other structures and configurations. The description of these other embodiments of the filter is skipped herein. It should be also noted that the filter 170 may not be necessary in some embodiments of the hydroponic cultivation unit.

Figure 7B:
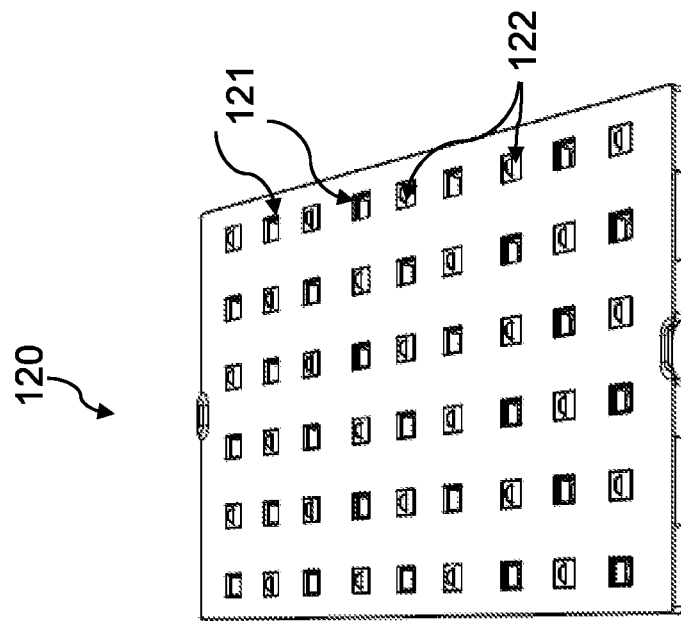
FIG. 7B illustrates the use of non-transparent plugs in the planting board as shown in FIG. 7A.
Figure 7A:
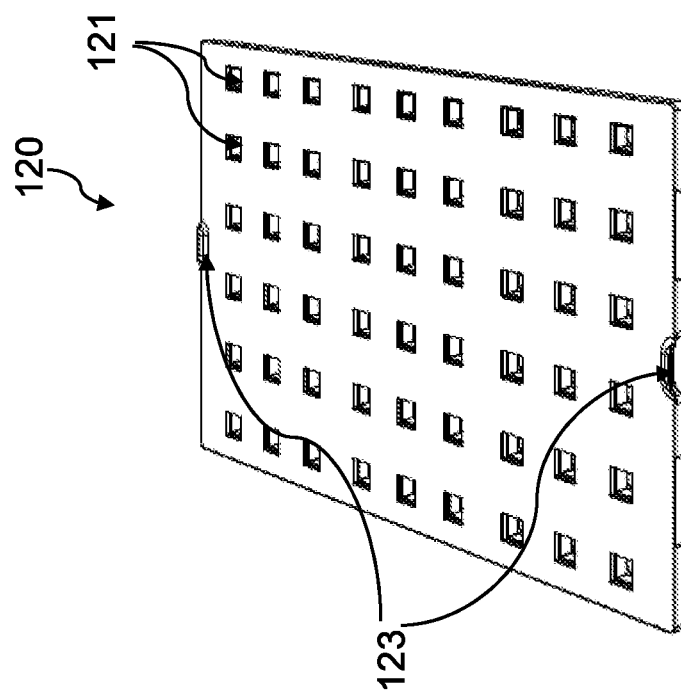
FIG. 7A illustrates a planting board for use in a hydroponic cultivation unit according to some embodiments of the present disclosure.

As mentioned above, a hydroponic cultivation unit further includes a planting board 120, disposed over a top opening of the tank 110. As shown in FIG. 1 and FIG. 7A, the planting board 120 is provided with a plurality of through-holes 121, which are arranged in a matrix having rows and columns, and each through hole 121 is specifically the holding space for a plant being cultivated using the hydroponic cultivation unit.

The planting board 120 can includes, for example, a total of 180 or 54 through-holes according to some embodiments of the present disclosure, but can also include other number of through-holes depending on practical needs.

Typically, a planting board 120 with a higher number of though-holes (e.g. 180 through-holes) can be employed for cultivating plants at their germination stage, when the plants are commonly small in sizes and take relatively small growth space on the planting board 120 and in the tank 110 of the hydroponic cultivation unit 100. A planting board 120 with a lower number of through-holes (e.g. 54 through-holes) can be employed for cultivating plants at post-germination stages (for example, culturing stage I), when the plants are growing bigger and take more growth space on the planting board 120 and in the tank 110 of the hydroponic cultivation unit 100.

Figure 7C:
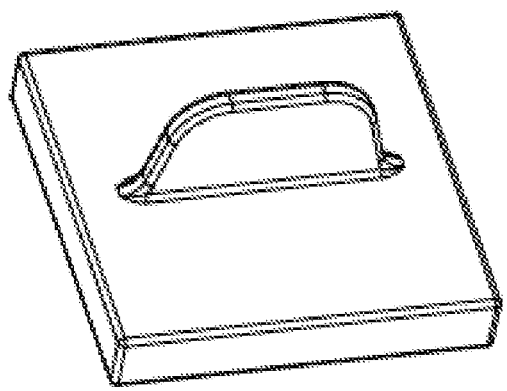
FIG. 7C is a perspective view of the plug as shown in FIG. 7B.
Figure 7D:
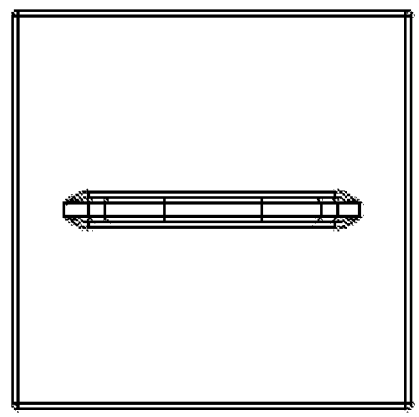
FIG. 7D is a top view.
Figure 7E:
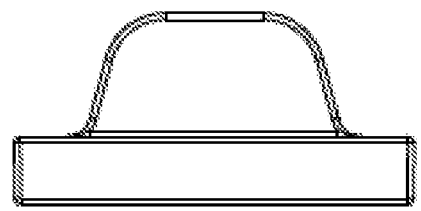
FIG. 7E is a side view.

In order to accommodate the needs for growing plants of a bigger size at a later stage (e.g. culturing stage II, which is after the culturing stage I as mentioned above), a plurality of plugs 122 (illustrated in FIGS. 7C, 7D and 7E) can be employed to reduce the number of through-holes that are available for growing plants. For example, as illustrated in FIG. 7B, the plurality of plugs 122 can be used to plug in the alternate through-holes 121 on a same row and in the alternate through-holes 121 on a same column, to thereby obtain evenly-distributed through-holes of a reduced number (e.g. 27 through-holes after disposing the plugs 122).

It is noted that besides the way by which the plurality of plugs 122 are distributed as described and illustrated above, they can be configured to cover the through-holes in any manner and there are no limitations herein. To block light from shedding into the tank to thereby prevent growth of algae in the hydroponic cultivation unit, each of the plurality of plugs 122 preferably has a composition of a non-transparent material.

Figure 7F:
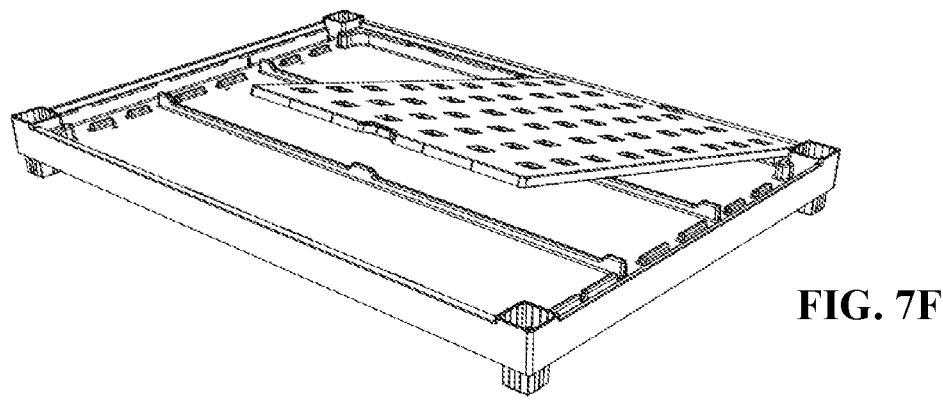
FIG. 7F illustrates the mounting of a planting board with a tank according to some embodiments of the disclosure.
Figure 7G:
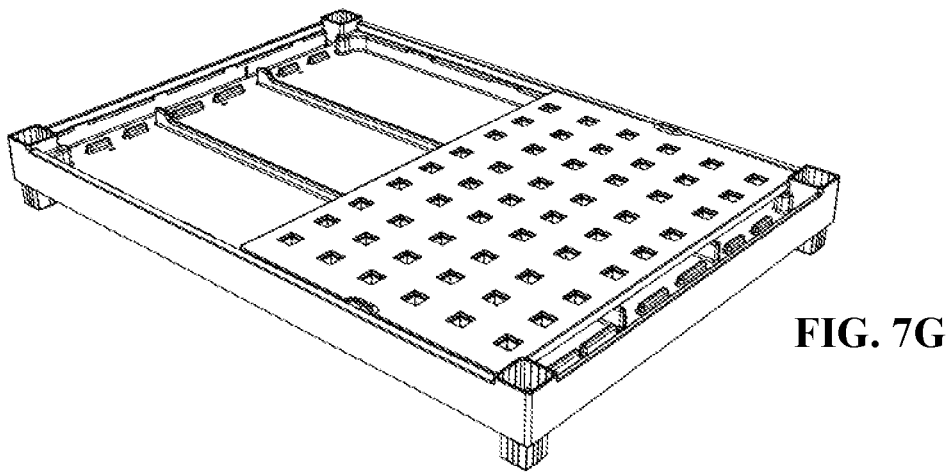
FIG. 7G illustrates relative positions of a planting board with a tank according to some embodiments of the disclosure.
Figure 7H:
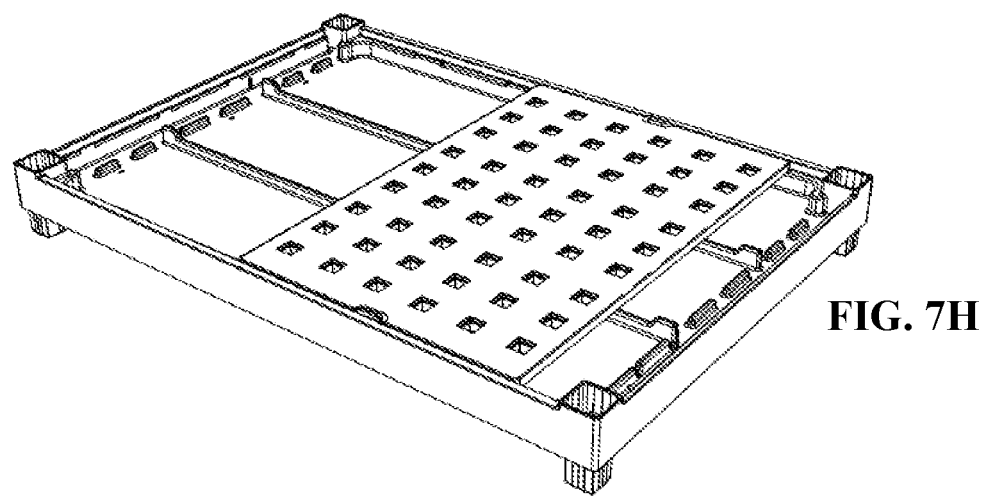
FIG. 7H illustrates relative positions of a planting board with a tank according to some other embodiments of the disclosure.

As shown in FIG. 7A, the planting board 120 can be provided with two indentations 123, arranged on opposing sides of the planting board 120 respectively. The indentations 123 are configured to function as matching parts for the protruding bars 116 on the sidewalls of the tank 110 to thereby provide a mounting means and a sliding means for the planting board 120 with the tank 110, as illustrated in FIGS. 7F, 7G and 7H.

As mentioned above and illustrated in FIG. 1, a hydroponic cultivation unit disclosed herein can optionally include at least one light blocking cover 130, disposed above the tank 110 and on an edge of the planting board 120 to prevent light from entering the tank 110 to thereby effectively prevent algae from growing in the tank. For example, the hydroponic cultivation unit 100 as shown in FIG. 1 comprises a pair of light blocking covers 130, which are respectively disposed on the two opposing sides of the rectangular tank 110 to juxtapose the planting board 120 in the middle. Other embodiments of the hydroponic cultivation unit having at least one light blocking cover 130 are possible, depending on the different shape, size, and configuration of the planting board 120 and the tank 110. Description of these embodiments are skipped herein.

Compared with conventional hydroponic cultivation devices, all the parts for the hydroponic cultivation unit as described above, such as the tank (having separation bars and corner portions integrated thereon), the removable dam members, the removable dispensers, the planting board, the plugs, the light blocking covers, can be conveniently mass-manufactured and installed, requires no inclination and allows for recycling of culture solutions during cultivation of the plants.

Furthermore, because of the designs of the hydroponic cultivation unit as described and illustrated above, it can be suitable for modular use in a hydroponic cultivation system.

Specifically, multiple hydroponic cultivation units can be combinatorially assembled to form a plant cultivation sub-system, which along with a culture solution recycling sub-system and a lighting sub-system, from a hydroponic cultivation system. Details will be provided in the following through specific embodiments.

Figure 8A:
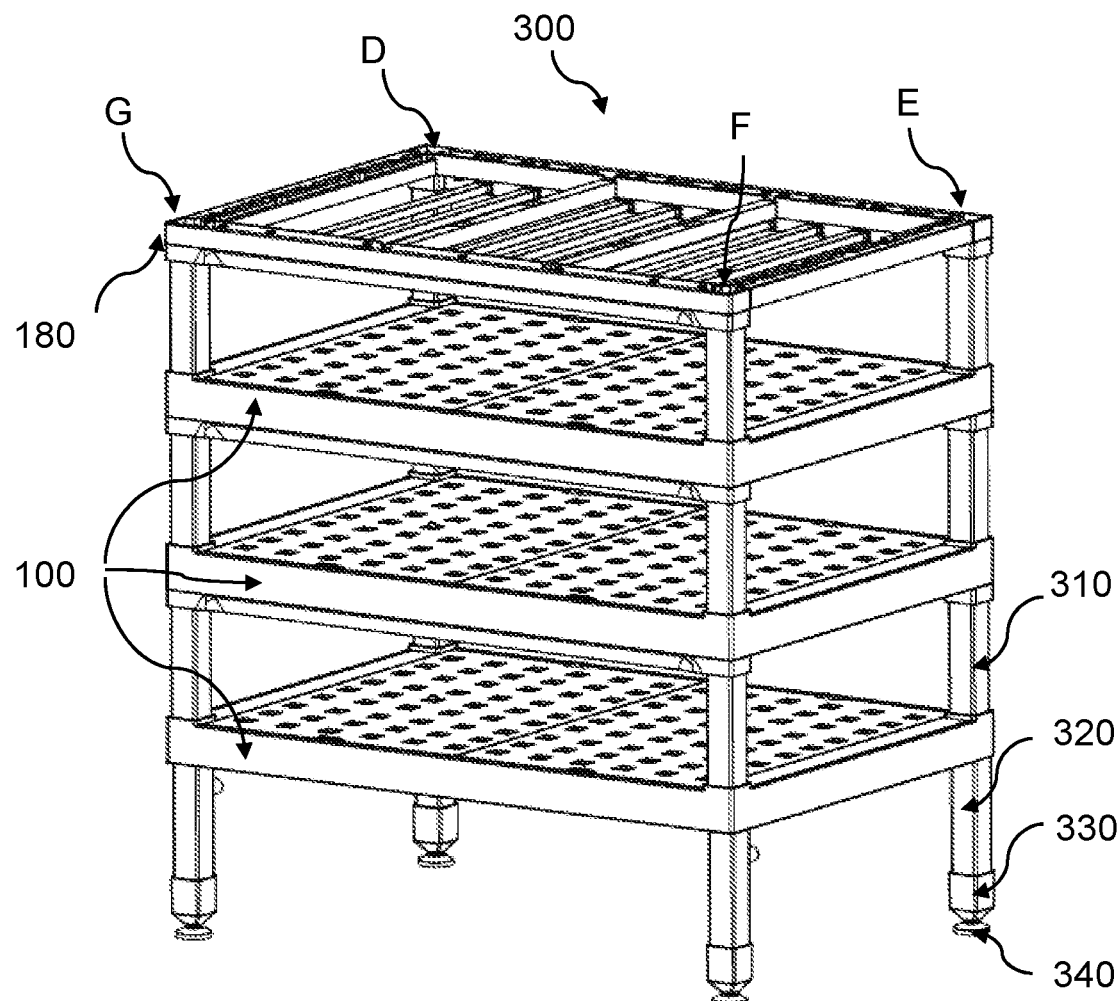
FIG. 8A is a schematic diagram of the main structure of a multi-level plant cultivation sub-system in a hydroponic cultivation system according to some embodiments of the present disclosure.
Figure 8D:
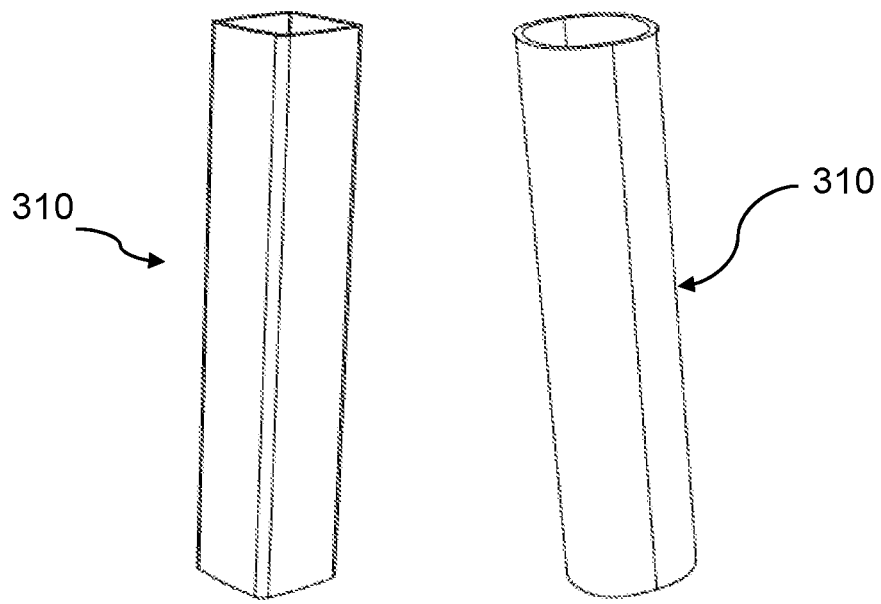
FIG. 8D illustrates the attachment of the pipe with a hydroponic cultivation unit according to some embodiments of the present disclosure.
Figure 8D:
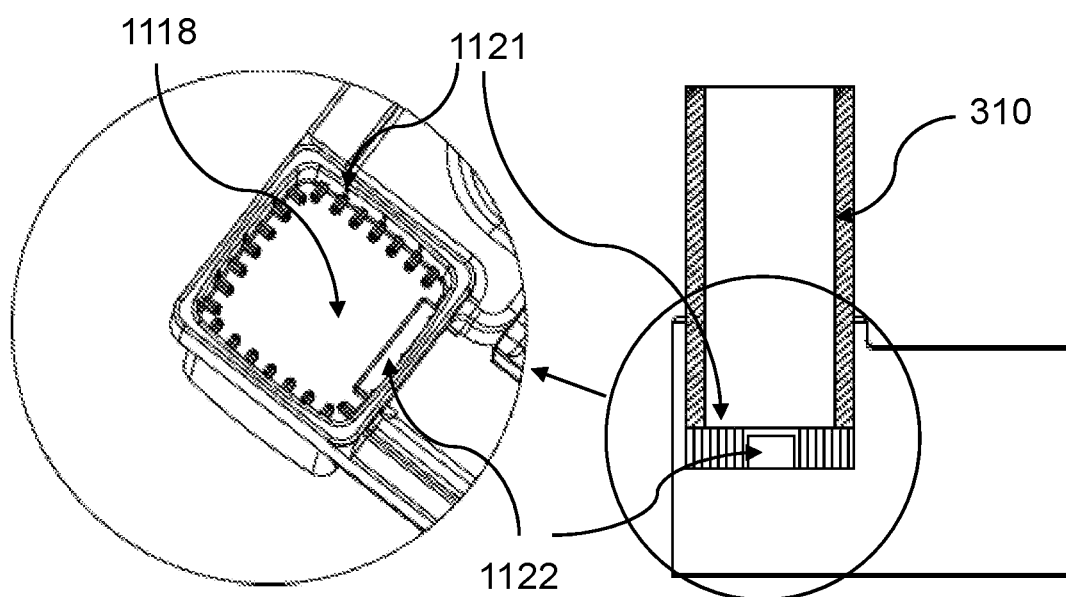
Figure 8G:
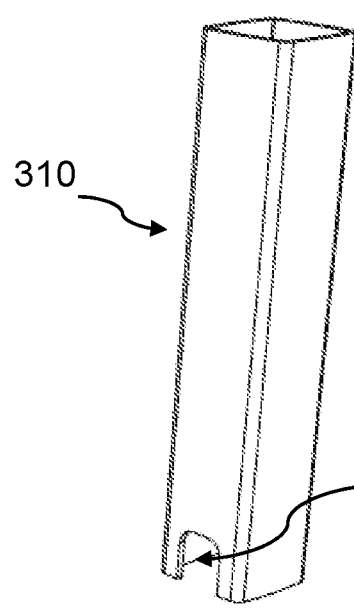
FIG. 8G is a schematic diagram of the attachment of the pipe with a hydroponic cultivation unit according to some other embodiments of the present disclosure.
Figure 8G:
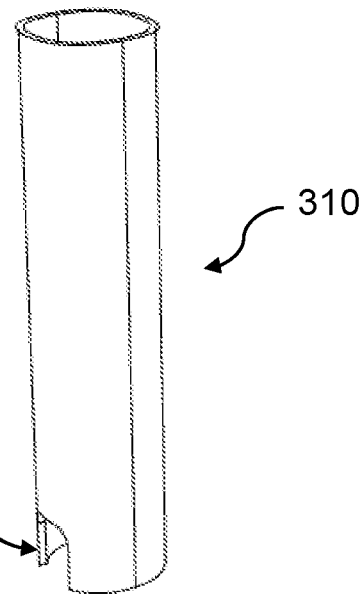
Figure 8G:
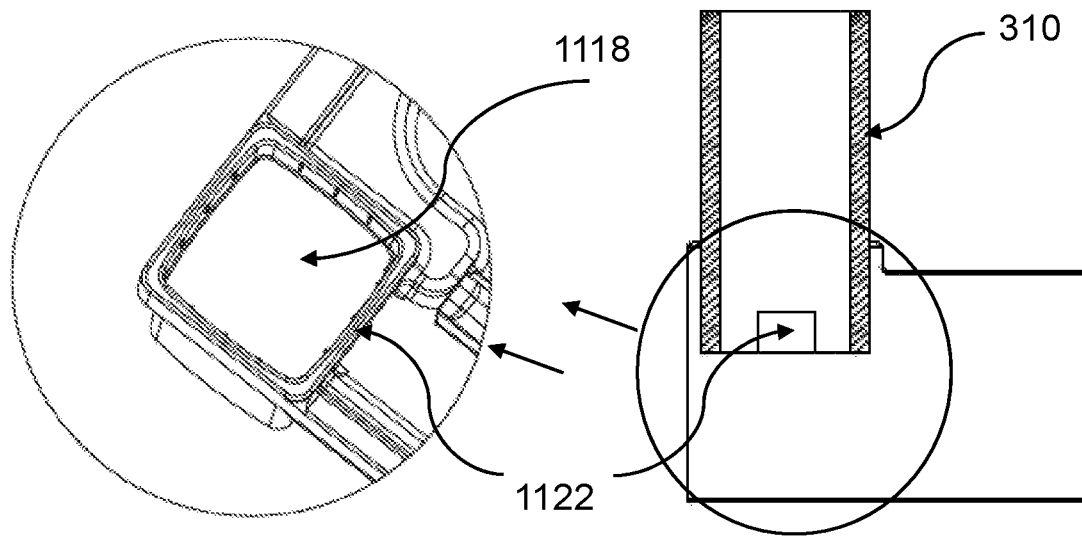

FIG. 8A is a schematic diagram of the main structure of a plant cultivation sub-system according to some embodiments of the present disclosure. The plant cultivation sub-system 300 comprises a plurality of hydroponic cultivation units 100, which are vertically stacked one another to form a multi-level shelf-like structure. The plurality of hydroponic cultivation units 100 can be based on any of the embodiments of the hydroponic cultivation unit as described above.

In the plant cultivation sub-system 300 as shown in FIG. 8A, four pipes 310 are disposed between every two neighboring levels of the hydroponic cultivation units at positions of the four corners (to avoid confusion, only the pipe at corner E is marked), which are configured to provide mechanical connection, hydrological coupling, and/or electrical coupling between the two neighboring levels of the hydroponic cultivation units 100 in the multi-level hydroponic cultivation system. Herein corner D, E, F, and G correspond to the four corners of the hydroponic cultivation unit as described above.

FIG. 8B is a perspective view of a pipe 310 that is utilized in the multi-level hydroponic cultivation system as mentioned above. As shown in the figure, the pipe 310 is of a rectangle/square-like cross-section, has an empty inner space, and is provided with two openings on each of the two ends of the pipe respectively. The cross-section of the pipe 310 can have other shapes, such as a circle (as shown FIG. 8C) according to some other embodiments of the disclosure.

To bring about convenience to mount and attach the pipes 310 with the corner portions of the tank 110, the upper opening 1118 of the corner portion can be further provided with a plurality of reinforcing bars 1121, which can be the plurality of reinforcing bars 1120 protruding from the inside wall of the upper opening 1118 at a certain depth to thereby function as a step on which the pipe 310 as illustrated in FIGS. 8B and 8C contact, attach and stand. This is convenient for attaching or connecting a pipe as such with the inlet portion 141, the outlet portion 143, or the wiring corner portion 142, which each has a side opening 1122 serving as the opening for the culture solution or for the wiring of each hydroponic cultivation unit. This embodiment of the pipe 310 can also be suitable for other corner portions (such as 144) with no side openings arranged thereon (not shown in drawings).

FIGS. 8E and 8F are pipes 310 with a square- or circle-shaped cross-section according to some other embodiments of the present disclosure. As shown in these two figures, each of the pipes 310 is provided with a nick 1123 at one end of the pipe 310, which is configured to provide a space for a side opening 1122 of a corner portion (such as the inlet portion 141, the wiring corner portion 142, and the outlet portion 143) of a tank of a hydroponic cultivation unit. By means of the nick 1123 of a pipe 310 as such, when mounting the pipes with the corner portion 141, 142 or 143, the pipe 310 can be directly inserted from the upper opening 1118 such that the nick 1123 fittingly attaches the side opening 1122 of the corner portion.

The pipe 310 can have a composition with a high mechanic strength, which can be a metal (e.g. aluminum), a polymer plastic (e.g. ABS), or some other materials. Preferably, the pipe 310 has a composition of a polymer plastic, which is advantageous over other materials by its resistance to acids, alkali, rust, and corrosion. Additionally, the empty space inside the pipe 310 can be utilized as a passageway for the culture solution, or as a wiring passage.

In order to ensure a secure and water-tight connection between the pipes 310 and the hydroponic cultivation units, the connection portions of the pipes and the corner portions of the tank of the hydroponic cultivation units can have opposing-gender (male and female) threads. This additionally allows for convenient assembly and disassembly of the whole hydroponic cultivation system.

In some embodiments of the plant cultivation sub-system 300, atop level having no hydroponic cultivation units 180 (illustrated in FIG. 8A) arranged can be optionally disposed on the very top level. The top level as such can play a structural role in the shelf-like structure of the plant cultivation sub-system, and can also be equipped with a plant-compatible light source for the hydroponic cultivation unit on a lower neighboring level. Detailed description of the structure of the top level 180 is skipped herein.

In the plant cultivation sub-system 300 as shown in FIG. 8A, the pipes 310 located on two opposing corners (D and F) of the multi-level shelf-like structure are specifically configured to provide hydrological connection between hydroponic cultivation units on different levels; the pipes 310 on another corner (G) are specifically configured to provide electrical connection between hydroponic cultivation units on different levels; the pipes 310 on the last corner (E) may be primarily configured to provide mechanical support, but may have other functions as well.

It should be noted that the above specific assignment of pipes 310 at different corners (D, E, F, and G) for hydrological connection and electrical connection is arbitrary, and could be switched. Other embodiments are possible, and there are no limitations herein.

In the plant cultivation sub-system 300 as shown in FIG. 8A, four ground pipes 320 (to avoid confusion, only the ground pipe at corner E is marked) are arranged between the bottom level of hydroponic cultivation unit and the ground, and are configured to provide a mechanical support to the whole plant cultivation sub-system 300. The bottom end of each ground pipe 320 is covered with a cap 330 (to avoid confusion, only the cap at corner E is marked) to securely and water-tightly cover the opening of the ground pipe 320, and the cap 330 is further attached to an adjustable foot 340 (to avoid confusion, only the adjustable foot at corner E is marked) which stands on the ground.

Additionally, depending on their respective corner position, these four ground pipes 320 can be provided with features for hydrological connection (corners D and F) and electrical connection (corner G). For example, the ground pipes 320 at corners D and F can be respectively provided with an opening on a sidewall thereof, which is configured for connection with other parts of the culture solution recycling sub-system, such as the culture solution reservoir. The ground pipe 320 at corner G can be provided with an opening on a sidewall thereof, which is configured for connection of the electrical wirings in the plant cultivation sub-system with an outside power source.

It is noted that besides the embodiment of multi-level plant cultivation sub-system as illustrated in FIG. 8A, various other embodiments are possible depending on different configurations in numbers of levels and inter-level distances.

For example, a hydroponic cultivation system according to a first embodiment can have three levels of hydroponic cultivation units, as illustrated in FIG. 9A; whereas a hydroponic cultivation system according a second embodiment can have six levels of hydroponic cultivation units, as illustrated in FIG. 9C. On the other hand, as illustrated by FIG. 9A and FIG. 9B, different embodiments of the hydroponic cultivation system can have a different inter-level distance, determined primarily by the length of the connecting pipes 310. Additionally, a hydroponic cultivation system can also have multiple different inter-level distances among neighboring levels of the hydroponic cultivation units, as illustrated in FIG. 9D.

It should be noted that the number of levels of hydroponic cultivation units, and the inter-level distance as well, can be configured based on factors such as the actual height of a room where the hydroponic cultivation system is located, the expected height of the plants being cultivated, and specific growth stages of the plants, etc. There are no limitations herein.

In the multi-level plant cultivation sub-system as shown in FIG. 8A, a culture solution recycling sub-system can be further provided, configured specifically to realize a vertical recycling of the culture solution in the whole hydroponic cultivation system.

The culture solution can first flow from the inlet of, and through, the hydroponic cultivation unit on the uppermost level (n), next it flows through the hydroponic cultivation unit on a second level that is one level lower than the uppermost level (n−1), then it flows through the hydroponic cultivation unit on a third level (n−2), and so on, until it flows through the hydroponic cultivation unit on the lowermost level to ultimately get out of the whole hydroponic cultivation system.

To achieve the vertical recycling of culture solution as described above, the culture solution recycling sub-system need to include a culture solution reservoir (not shown in the drawings) containing the culture solution, a pump (not shown in the drawings) configured to pump the culture solution up to the uppermost level, in addition to the main multi-level plant cultivation sub-system as described above. Furthermore, the multi-level plant cultivation sub-system also needs to have a special configuration allowing for appropriate hydrological connection between pipes, and between pipes and the inlet, tank, and outlet of the hydroponic cultivation unit on each level.

Figure 10A:
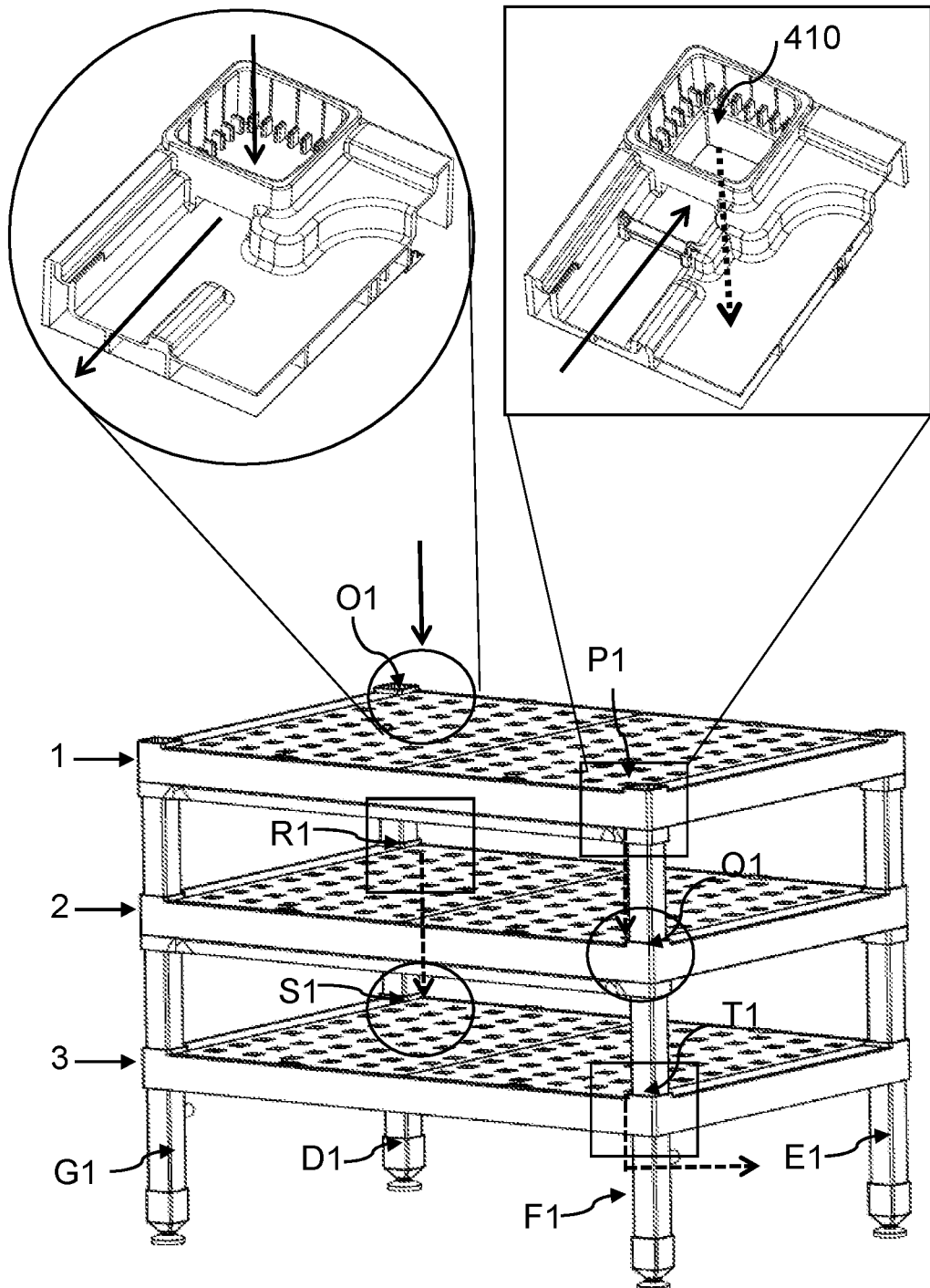
FIG. 10A illustrates a first configuration of a hydroponic cultivation system realizing the vertical recycling of the culture solution according to some embodiments of the present disclosure.

FIG. 10A illustrates a configuration of the hydroponic cultivation system realizing the vertical recycling of the culture solution according to one embodiment of the present disclosure.

In this demonstrating example, the three-level hydroponic cultivation system utilizes pipes at corner D1 and at corner F1 for the hydrologic coupling among the three levels of the hydroponic cultivation units, and utilizes the specially designed inlet portions and outlet portions in each of the three levels of the hydroponic cultivation units to thereby achieve the vertical recycling of culture solution in the whole hydroponic cultivation system.

As indicated by the solid lined arrow in FIG. 10A, the culture solution first flows from a top opening of the inlet portion O1 (marked by a circle) of the hydroponic cultivation unit on the $1^{st}$ level (i.e. $1^{st}$-level unit). Because there is no bottom opening in the inlet portion O1, the culture solution flows horizontally through a side opening of the inlet portion O1 into the $1^{st}$-level unit. After running through the $1^{st}$-level unit, the culture solution arrives at the outlet portion P1 (marked by a square). Because there is a bottom opening 410 in the outlet portion P1, the culture solution can flow down along the connecting pipe to arrive at the inlet portion Q1 (marked by a circle) of the $2^{nd}$-level unit.

Similar to the inlet portion O1, the inlet portion Q1 also has no bottom opening, and thus the culture solution can flow into the $2^{nd}$-level unit through a side opening of the inlet portion Q1. After running through the $2^{nd}$-level unit, the culture solution arrives at the outlet portion R1 (marked by a square). Similar to the outlet portion P1, the outlet portion R1 has a bottom opening, through which the culture solution can flow down along the connecting pipe to arrive at the inlet portion S1 (marked by a circle) of the $3^{nd}$-level unit.

Similar to the inlet portion O1 and the inlet portion Q1, the inlet portion S1 also has no bottom opening, and thus the culture solution can flow into the $3^{rd}$-level unit through a side opening of the inlet portion S1. After running through the $3^{rd}$-level unit, the culture solution arrives at the outlet portion T1 (marked by a square). Similar to the outlet portion P1 and the outlet portion R1, the outlet portion T1 has a bottom opening, through which the culture solution can flow down to the ground pipe at corner F1. Through a side opening of the ground pipe at corner F1, the culture solution can ultimately flow out of the whole hydroponic cultivation system to thereby conclude a vertical recycling of the culture solution.

In the illustrating example in FIG. 10A, the culture solution runs through the whole hydroponic cultivation system in an "inlet portion O1-outlet portion P1-inlet portion Q1-outlet portion R1-inlet portion S1-outlet portion T1" sequence. As such, by arranging inlet portions and outlet portions alternately on the hydroponic cultivation units on each individual level, the culture solution can flow from the uppermost level of hydroponic cultivation unit, through the multiple intermediate levels of hydroponic cultivation units in a zigzag manner, and out of the lowermost level of the hydroponic cultivation units, thereby realizing a vertical recycling of the culture solution in the whole hydroponic cultivation system.

Figure 10B:
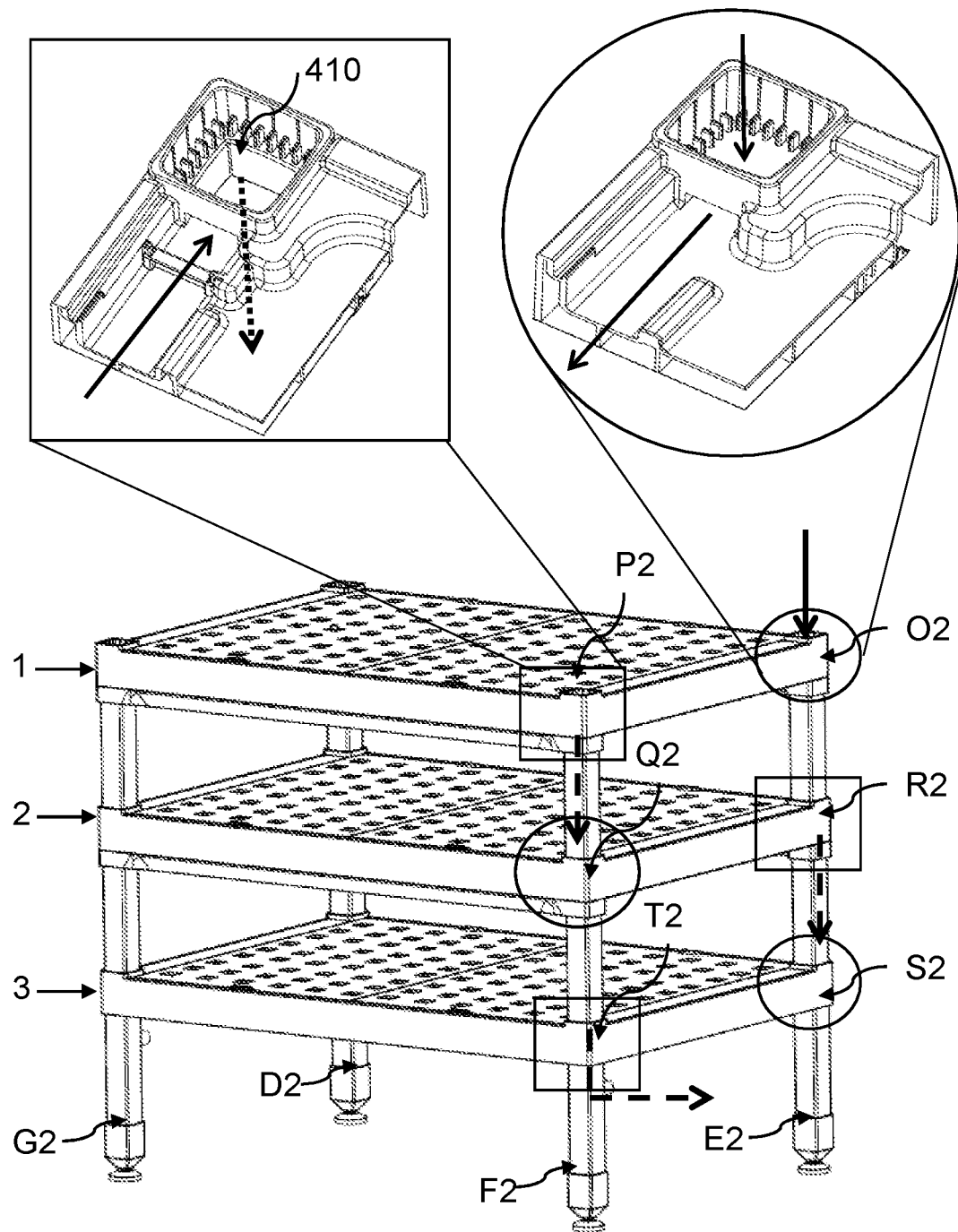
FIG. 10B illustrates a second configuration.

FIG. 10B illustrates a configuration of the hydroponic cultivation system realizing the vertical recycling of the culture solution according to another embodiment of the present disclosure.

In this example, the three-level hydroponic cultivation system utilizes pipes at corner E2 and at corner F2 for the hydrologic coupling among the three levels of the hydroponic cultivation units, and utilizes the specially designed inlet portions and outlet portions in each of the three levels of the hydroponic cultivation units to thereby achieve the vertical recycling of culture solution in the whole hydroponic cultivation system.

As indicated by the solid lined arrow in FIG. 10B, the culture solution first flows from a top opening of the inlet portion O2 (marked by a circle) of the hydroponic cultivation unit on the $1^{st}$ level (i.e. $1^{st}$-level unit). Because there is no bottom opening in the inlet portion O2, the culture solution flows horizontally through a side opening of the inlet portion O2 into the $1^{st}$-level unit. After running through the $1^{st}$-level unit, the culture solution arrives at the outlet portion P2 (marked by a square). Because there is a bottom opening 410 in the outlet portion P2, the culture solution can flow down along the connecting pipe to arrive at the inlet portion Q2 (marked by a circle) of the $2^{nd}$-level unit.

Similar to the inlet portion O2, the inlet portion Q2 also has no bottom opening, and thus the culture solution can flow into the $2^{nd}$-level unit through a side opening of the inlet portion Q2. After running through the $2^{nd}$-level unit, the culture solution arrives at the outlet portion R2 (marked by a square). Similar to the outlet portion P2, the outlet portion R2 has a bottom opening, through which the culture solution can flow down along the connecting pipe to arrive at the inlet portion S2 (marked by a circle) of the $3^{nd}$-level unit.

Similar to the inlet portion O2 and the inlet portion Q2, the inlet portion S2 also has no bottom opening, and thus the culture solution can flow into the $3^{rd}$-level unit through a side opening of the inlet portion S2. After running through the $3^{rd}$-level unit, the culture solution arrives at the outlet portion T2 (marked by a square). Similar to the outlet portion P2 and the outlet portion R2, the outlet portion T2 has a bottom opening, through which the culture solution can flow down to the ground pipe at corner F2. Through a side opening of the ground pipe at corner F2, the culture solution can ultimately flow out of the whole hydroponic cultivation system to thereby conclude a vertical recycling of the culture solution.

In the illustrating example in FIG. 10B, the culture solution runs through the whole hydroponic cultivation system in an "inlet portion O2-outlet portion P2-inlet portion Q2-outlet portion R2-inlet portion S2-outlet portion T2" sequence. As such, by arranging inlet portions and outlet portions alternately on the hydroponic cultivation units on each individual level, the culture solution can flow from the uppermost level of hydroponic cultivation unit, through the multiple intermediate levels of hydroponic cultivation units in a zigzag manner, and out of the lowermost level of the hydroponic cultivation units, thereby realizing a vertical recycling of the culture solution in the whole hydroponic cultivation system.

In the whole multi-level hydroponic cultivation system, a filter as described above can be disposed for a hydroponic cultivation unit in each level, at a position of the tank that is immediately next to an outlet portion, and is configured to retain unwanted matters to thereby ensure continuous recycling of the culture solution.

In some other embodiments, only the hydroponic cultivation unit on the very bottom level can be provided with a filter, configured to retain all the unwanted matters from the culture solution before the culture solution being recycled leaves the multi-level hydroponic cultivation system.

In the culture solution recycling sub-system as described above, in order to provide convenience for the hydrological connection and disconnection during assembly and disassembly of the hydroponic cultivation system, the connection portion for each pipe, inlet, and outlet can be optionally provided with a secure, detachable and connection means. For example, a hydrological connection and disconnection between a pipe and an inlet of a tank of a hydroponic cultivation unit can be realized by means of a male thread and a female thread on the portions of the pipe and the inlet to be connected or disconnected. Other embodiments are also possible.

Because the growth of plants needs light, the multi-level plant cultivation sub-system as described above thus needs to include a lighting sub-system. The lighting sub-system can comprise a power source, a plurality of plant-compatible light sources, and a wiring circuit. The power source (not shown in the drawings) is configured to supply power to each of the plurality of plant-compatible light source via the wiring circuit, and each of the plurality of plant-compatible light sources is configured to support growth of the plants being cultivated on the hydroponic cultivation unit on each level.

In some embodiments of the present disclosure, a plant-compatible light source can be arranged as an independent part between two hydroponic cultivation units on two neighboring levels. In some other embodiments of the present disclosure, a plant-compatible light source can be preferably disposed on a back of the tank of a hydroponic cultivation unit on an upper level (i.e. level n+1), and configured to provide plant-compatible light to support the growth of plants being cultivated at the hydroponic cultivation unit on a lower neighboring level (i.e. level n).

Figure 11A:
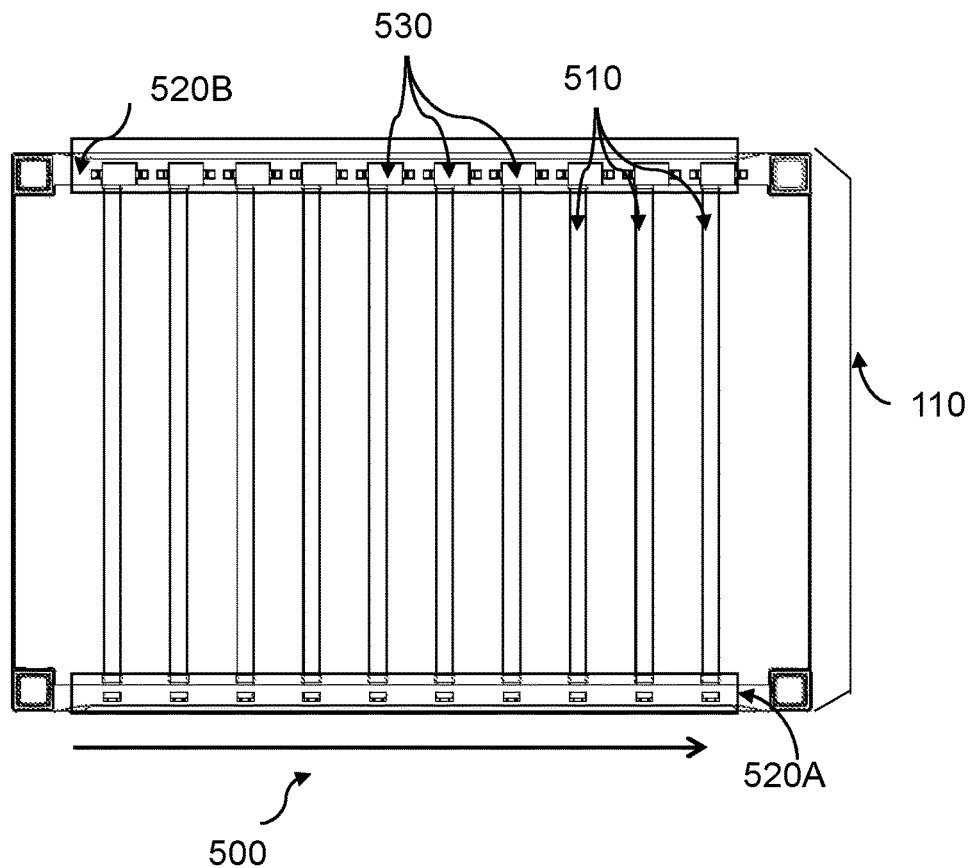
FIG. 11A illustrates a top view of a configuration where a plant-compatible light source is disposed on the back of a tank of a hydroponic cultivation unit according to some embodiments of the present disclosure.
Figure 11B:
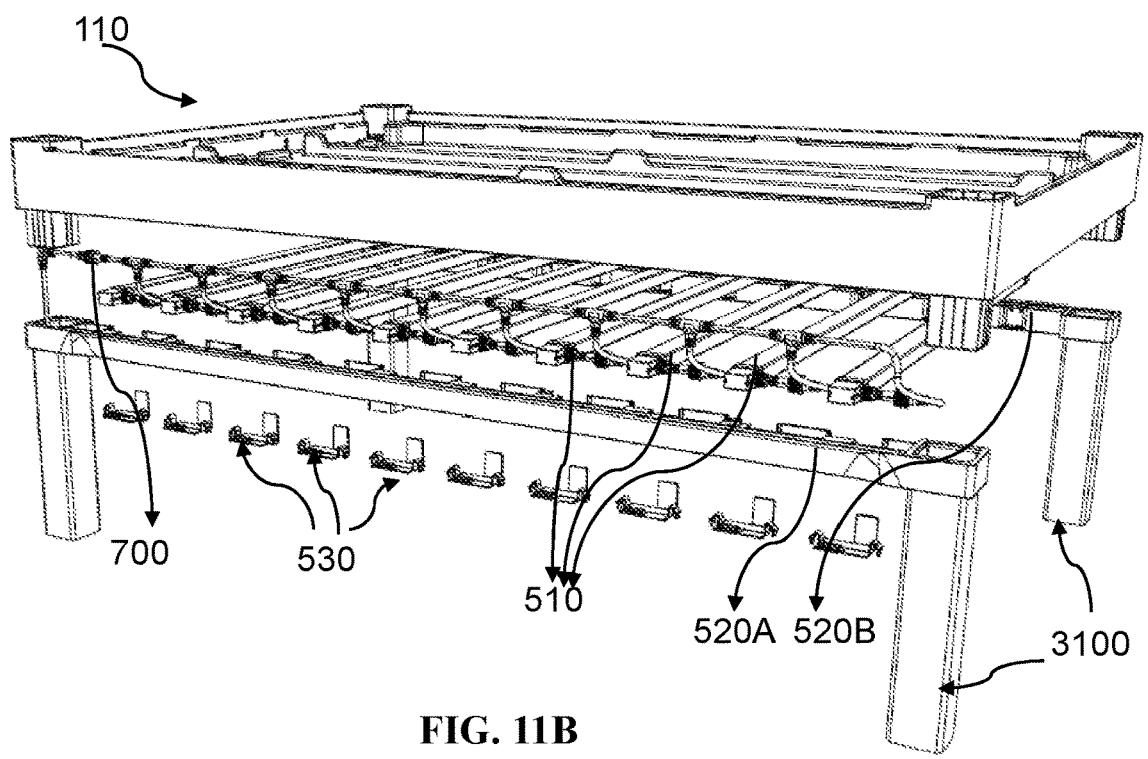
FIG. 11B illustrates a perspective view.

FIG. 11 illustrates a plant-compatible light source disposed on the back of a tank of a hydroponic cultivation unit according to some embodiments of the present disclosure. The plant-compatible light source 500 comprises a plurality of lamps, configured to emit a plant-compatible light that supports growth of plants being cultivated. The lamp can be a LED lamp that emits plant-compatible lights, but can be of other types.

As shown in FIG. 11, the plurality of lamps are arranged in evenly spaced columns, and each lamp 510 is mounted on the back surface of the tank 110 of the hydroponic cultivation unit through a pair of mounting racks, including a first mounting rack 520A, and a second mounting rack 520B. The first mounting rack 520A and the second mounting rack 520B are respectively disposed on the back of the tank 110 along two opposing sidelines.

Besides the role in mounting each lamp 510, the first mounting rack 520A is configured to also provide an electrical connection between each lamp 510 and the wiring circuit (illustrated by the arrow in FIG. 11) embedded in one sidewall of the tank 110 of the hydroponic cultivation unit. The second mounting rack 520B is configured to accompany the first mounting rack 520A to play the role in mounting each lamp 510. In addition to this embodiment, other embodiments are also possible for the arrangement of the mounting racks and configuration.

A plurality of lamp connection covers 530 are disposed on at least one of the first mounting rack 520A and the second mounting rack 520B. Each lamp connection cover 530 is arranged to cover each site of connection between each lamp and the first mounting rack 520A and/or the second mounting rack 520B, and as such, is configured to provide a means for mounting and/or hiding the wirings.

Figure 12:
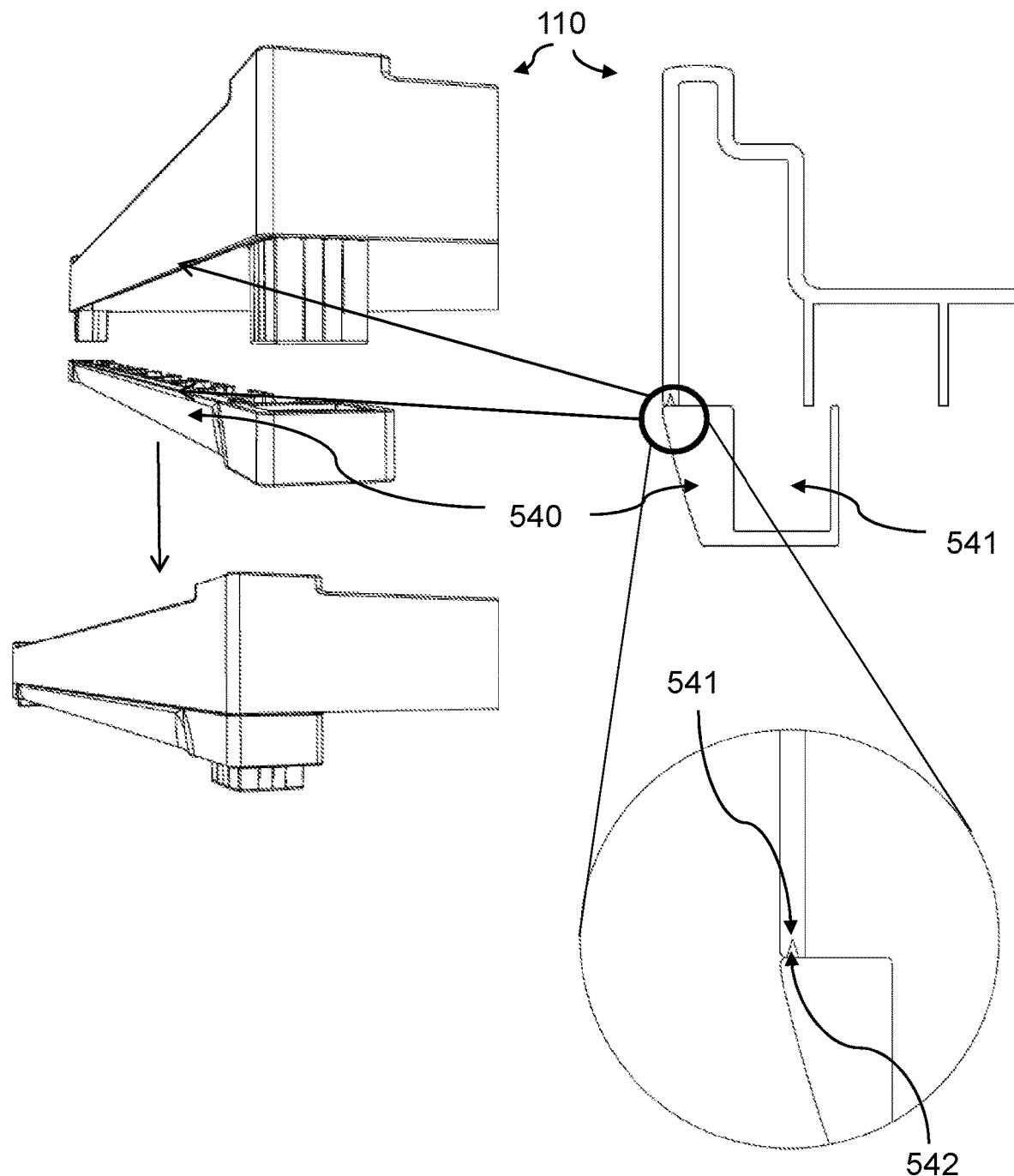
FIG. 12 illustrates a secure and water-proof attachment of wirings and lamp-wiring connections sites of a plant-compatible light source according to some embodiments of the present disclosure.

As shown in FIG. 12, the lighting sub-system of the hydroponic cultivation system is additionally provided with a cover 540, which is disposed below, and securely attached with, a sidewall of a tank 110, and is configured to provide a water-proof housing 541 for the wirings and the connection sites between the wirings and the lamp. The water-proof housing 541 is arranged on an inner side of the hydroponic cultivation unit.

The secure and water-proof attachment between the tank sidewall and the cover 540 can be realized for example, by a tongue and groove connection as shown in FIG. 12, wherein a tongue 542 arranged on an outer rim of the cover 540 is matchingly attached with a groove 541 on a corresponding outer rim of the sidewall of the tank. Besides the tongue and groove connection, other manners of connection can be possible as long as the connection is secure and can provide a water-proof housing 541 to the wirings and connections disposed therein.

It should be noted that in some embodiments where a top level includes no hydroponic cultivation unit is employed in the hydroponic cultivation system, a plant-compatible light source similar to that illustrated in FIG. 11 can be mounted on a bottom surface of the top level to provide a plant-compatible light to the plants being cultivated in the hydroponic cultivation unit on a lower neighboring level.

Figure 13A:
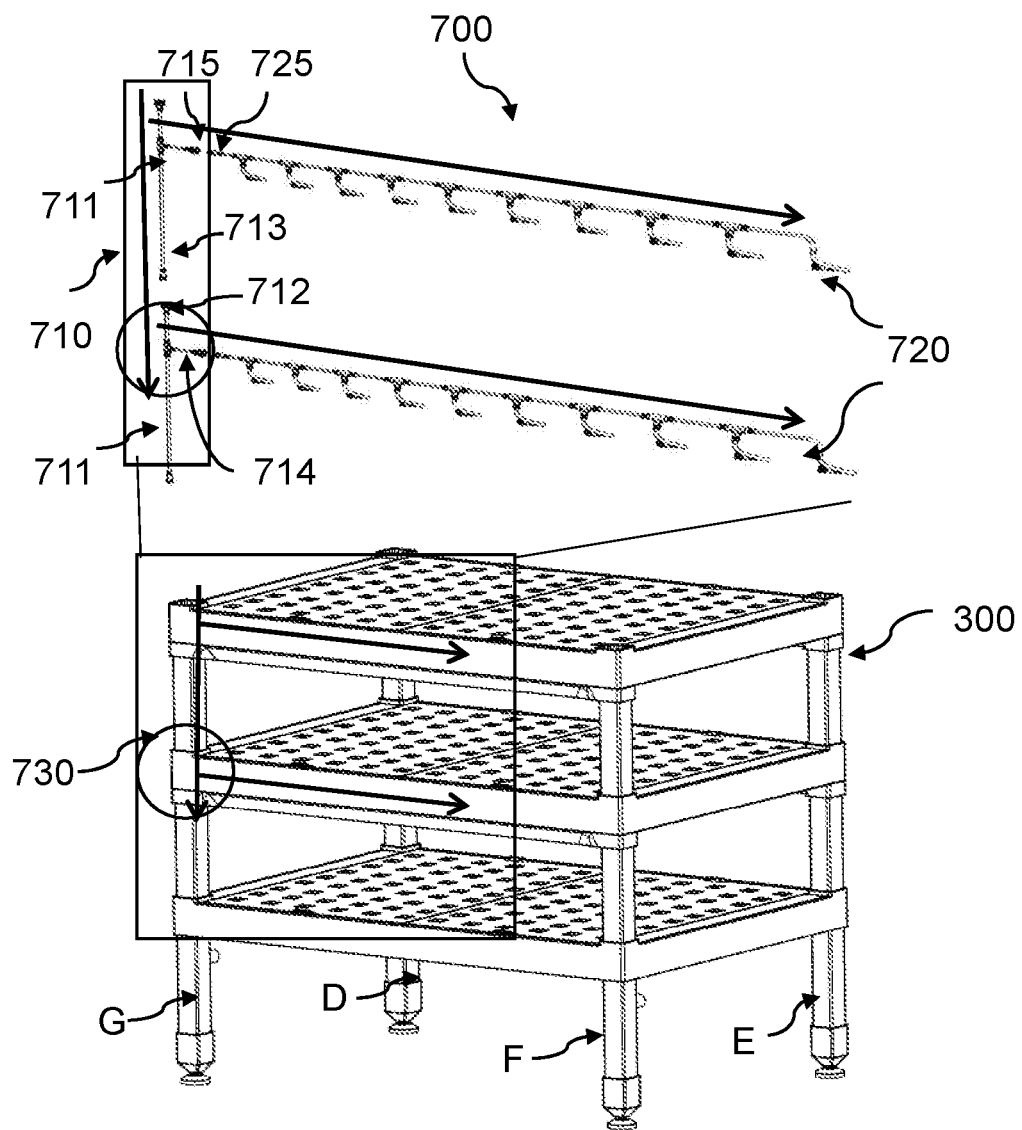
FIG. 13A illustrates a wiring circuit of the lighting sub-system in the hydroponic cultivation system according to some embodiments of the present disclosure.

FIG. 13A illustrates a wiring circuit of the lighting sub-system in the hydroponic cultivation system according to some embodiments of the present disclosure. The wiring circuit 700 comprises a main stem 710 and a plurality of branches 720. The main stem 710 runs through all levels of the plant cultivation sub-system 300 and is electrically connected with each of the plurality of unit branches 720.

Each of the plurality of branches 720 corresponds to, and is embedded in, a tank of a hydroponic cultivation unit on each level, and is configured to provide power to the plant-compatible light source 500 mounted on a back side of the hydroponic cultivation unit.

The main stem 710 is disposed to run through an empty space of each pipe corresponding to corner G and a corner portion 730 (marked as a circle) of each hydroponic cultivation on each level, and comprises a plurality of segments 711, each segment 711 corresponding to a level of the hydroponic cultivation unit. Every two neighboring segments 711 are electrically connected via a pair of first connectors 712 and 713.

Each segment 711 has a short branch 714, which is configured to electrically connect each unit branch 720 through a pair of second connectors 715 and 725, disposed respectively on an end of the short branch 714 and an end of the unit branch 720.

Figure 13B:
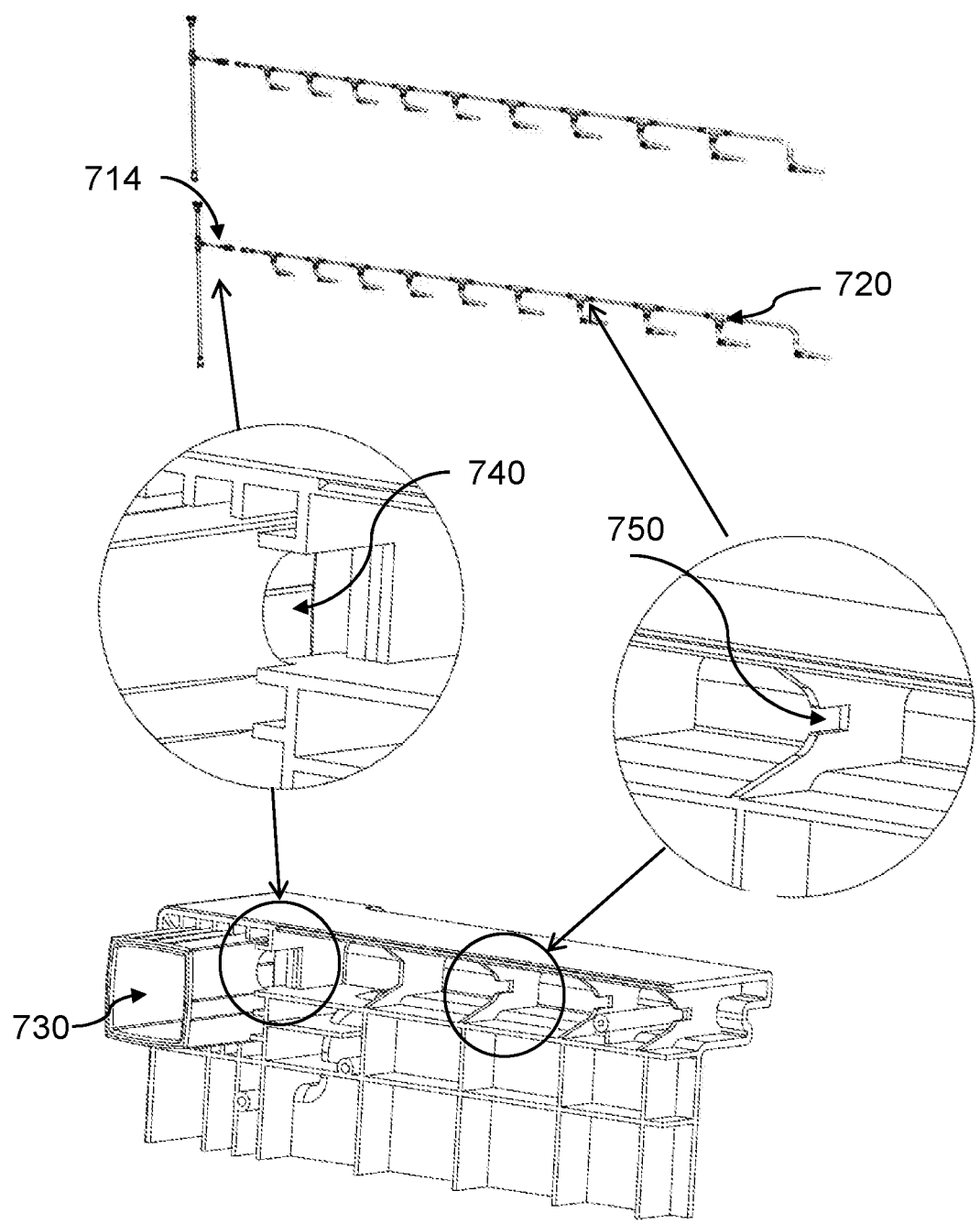
FIG. 13B illustrates a manner of arrangement of the wiring circuit according to some embodiments.

As shown in FIG. 13B, the corner portion 730 is provided with a side opening 740 to expose the short branch 714 to thereby allow the electrical connection between the short branch 714 with the unit branch 720.

The sideline of the tank 110 is further provided with a plurality of slots 750, each corresponding to a lamp and configured to provide a mounting and/or hiding means for the unit branch 720.

It should be noted that the wiring circuit 700 can have a different configuration than the embodiment as described above and illustrated in FIGS. 13A and 13B. Description of these other embodiments is skipped herein.

Compared with conventional hydroponic cultivation devices, the hydroponic cultivation unit and system as described above have the following advantages.

First, the tank of a hydroponic cultivation unit has an integrated structure, and as such, the tank, as well as other parts of the hydroponic cultivation unit, such as the planting board, the removable dispensers, and the removable dam members, etc., can be conveniently mass-manufactured, assembled and dissembled, can be less prone for breaking or leakage, and can also enjoy a longer operational life and reduced cost. In addition, the use of a non-metal plastic (e.g. ABS) for manufacturing the various parts of the hydroponic cultivation unit is advantages over the metal parts commonly used in conventional approach by having a lighter weight, and being resistant to acids, alkali, rust, and corrosion, and thus is especially suitable for indoor plant factories involving a high-humidity and high-salt environment.

Second, the design of the hydroponic cultivation unit, especially the removable dam members and the arrangement of separation bars on the tank bed, brings about a significant flexibility and convenience in controlling the depths and the passageways of the culture solution flowing in the tank, thus allowing for convenient switching between a deep cultivation mode and a shallow cultivation mode, which are required to support different growth stages (e.g. germination stage, culturing stage I, culturing stage II, etc.) of the plants being cultivated in the tank of the hydroponic cultivation unit.

Third, by means of the plugs that can be disposed to cover the plurality of through-holes in the planting board, the number of through-holes which provide holding space for the plants being cultivated can be conveniently adjusted, conveniently accommodating the needs to cultivate plants at different stages.

Fourth, the design of the hydroponic cultivation unit substantially allows for multiple hydroponic cultivation units being used combinatorially as modules for assembly as a hydroponic cultivation system having a vertical multi-level configuration, which can significantly reduce the growth space for plant cultivation. It is estimated that a single hydroponic cultivation system (i.e. a single shelf) only occupies a space of around 1-2 m$^2$. Also multiple hydroponic cultivation systems can be established side-by-side or back-to-back, which together can provide a highly scalable solution for plant factories.

Fifth, in the multi-level hydroponic cultivation system, the culture solution can be vertically recycled when it flows top-to-bottom through each of the hydroponic cultivation units on each level. As such, the amount of the culture solution required for growing plants can be greatly reduced, and it can also be energy-efficient.

Sixth, in the multi-level hydroponic cultivation system, the inter-level distance between any two levels of the hydroponic cultivation units can be readily customized, allowing for the cultivation of plants of various heights and at different stages; the number of levels can also be customized, a feature favorable to accommodate different heights of rooms and buildings in the plant factory.

Seventh, in the multi-level hydroponic cultivation system, all the wiring and piping are embedded in the connecting pipes, and by means of standardized connection interfaces (e.g. paired threads and electrical adapters), hydrological connections and electrical wirings can be readily established and dissembled.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A hydroponic cultivation system for cultivating plants in a continuously flowing culture solution, comprising:
   a plurality of hydroponic cultivation units, each configured to provide a cultivation bed for the plants, wherein:
      the plurality of hydroponic cultivation units are vertically stacked one over another to thereby form a multi-level structure; and
      every two neighboring hydroponic cultivation units are hydrologically coupled to one another such that the culture solution flows top-to-bottom through each of the plurality of hydroponic cultivation units on each level;
   and
   a plurality of support members, disposed between, and are configured to provide mechanical support for, two hydroponic cultivation units on every two neighboring levels, wherein:
      the plurality of support members comprise at least one pipe, each configured to arrange at least one of a hydrological connection or an electrical coupling between the two hydroponic cultivation units on the every two neighboring levels therein;
   wherein each of the plurality of hydroponic cultivation units comprises a tank, wherein the tank comprises:
   at least one separation bar, disposed on a bottom side of the tank and configured to separate the tank into a plurality of trough regions; and
   at least one removable dam member, configured to be removably mounted in the tank to thereby block the culture solution from flowing therethrough;
   wherein:
      the at least one separation bar and the at least one removable dam member are configured to allow a configurable passageway for the culture solution flowing in the tank.

2. The hydroponic cultivation system according to claim 1, wherein each of the plurality of hydroponic cultivation units further comprises a planting board, wherein:
   the planting board is removably disposed over a top opening of the tank; and
   the planting board is provided with a plurality of through-holes, wherein each through-hole is configured to provide a holding space for one of the plants being cultivated on the planting board.

3. A hydroponic cultivation system for cultivating plants in a continuously flowing culture solution, comprising:
- a plurality of hydroponic cultivation units, each configured to provide a cultivation bed for the plants, wherein:
  - the plurality of hydroponic cultivation units are vertically stacked one over another to thereby form a multi-level structure; and
  - every two neighboring hydroponic cultivation units are hydrologically coupled to one another such that the culture solution flows top-to-bottom through each of the plurality of hydroponic cultivation units on each level;

and
- a plurality of support members, disposed between, and are configured to provide mechanical support for, two hydroponic cultivation units on every two neighboring levels, wherein:
- the plurality of support members comprise at least one pipe, each configured to arrange at least one of a hydrological connection or an electrical coupling between the two hydroponic cultivation units on the every two neighboring levels therein;
- wherein the at least one pipe comprises a first pipe, configured to arrange a hydrological connection between two hydroponic cultivation units on every two neighboring levels therein, wherein:
- an outlet of one hydroponic cultivation unit on an upper level of the every two neighboring levels is hydrologically connected with a top opening of the first pipe; and
- a bottom opening of the first pipe is hydrologically connected with an inlet of another hydroponic cultivation unit on a lower level of the every two neighboring levels.

4. The hydroponic cultivation system according to claim 3, wherein the top opening of the first pipe is securely attached with an outlet portion of the one hydroponic cultivation unit on the upper level of the every two neighboring levels to allow a hydrological connection with the outlet of the one hydroponic cultivation unit, wherein the outlet portion is provided with:
- a lower opening, connected with the top opening of the first pipe; and
- a side opening, connected to a tank of the one hydroponic cultivation unit.

5. The hydroponic cultivation system according to claim 4, wherein the outlet portion comprises a lower protrusion, wherein the lower opening of the outlet portion is arranged on the lower protrusion, protruding downward from the outlet portion, wherein an outer wall of the lower protrusion is securely and water-tightly attached with an inner wall of an upper connection portion of the first pipe.

6. The hydroponic cultivation system according to claim 5, wherein the outer wall of the lower protrusion is securely and water-tightly attached with the inner wall of the first pipe by means of opposing-gender threads arranged respectively on the outer wall of the lower protrusion and on the inner wall of the upper connection portion of the first pipe.

7. The hydroponic cultivation system according to claim 5, wherein the outer wall of the lower protrusion is provided with a plurality of reinforcing bars, configured to provide a strong means for attaching the outer wall of the lower protrusion with the inner wall of the first pipe.

8. The hydroponic cultivation system according to claim 3, wherein the bottom opening of the first pipe is securely attached with an inlet portion of the another hydroponic cultivation unit on the lower level of the every two neighboring levels to allow a hydrological connection with the inlet of the another hydroponic cultivation unit, wherein:
- the inlet portion is provided with:
  - an upper opening, connected with the bottom opening of the first pipe;
  - a side opening, connected to a tank of the another hydroponic cultivation unit; and and
- the inlet portion comprises a bottom wall, disposed below the side opening.

9. The hydroponic cultivation system according to claim 8, wherein an outer wall of a lower connection portion of the first pipe is securely and water-tightly attached with an inner wall of the inlet portion of the another hydroponic cultivation unit on the lower level of the every two neighboring levels.

10. The hydroponic cultivation system according to claim 9, wherein the outer wall of the lower connection portion of the first pipe is securely and water-tightly attached with the inner wall of the inlet portion by means of opposing-gender threads arranged respectively on the outer wall of the lower connection portion of the first pipe and the inner wall of the inlet portion.

11. The hydroponic cultivation system according to claim 8, wherein the upper opening of the inlet portion is provided with a plurality of reinforcing bars, protruding from an inside wall of the upper opening and configured to function as a step for the bottom opening of first pipe to stand thereon to thereby allow a hydrological connection between the first pipe and the side opening of the inlet portion.

12. The hydroponic cultivation system according to claim 8, wherein the first pipe is provided with a nick at a bottom end and next to the bottom opening, configured to hydrologically connect with the side opening of the inlet portion and to allow the bottom end of the first pipe to attach with the bottom wall of the inlet portion.

13. A hydroponic cultivation system for cultivating plants in a continuously flowing culture solution, comprising:
- a plurality of hydroponic cultivation units, each configured to provide a cultivation bed for the plants, wherein:
  - the plurality of hydroponic cultivation units are vertically stacked one over another to thereby form a multi-level structure; and
  - every two neighboring hydroponic cultivation units are hydrologically coupled to one another such that the culture solution flows top-to-bottom through each of the plurality of hydroponic cultivation units on each level;

and
- a plurality of support members, disposed between, and are configured to provide mechanical support for, two hydroponic cultivation units on every two neighboring levels, wherein:
- the plurality of support members comprise at least one pipe, each configured to arrange at least one of a hydrological connection or an electrical coupling between the two hydroponic cultivation units on the every two neighboring levels therein;
- wherein:
- the at least one pipe comprises a second pipe, configured to arrange an electrical coupling between two hydroponic cultivation units on every two neighboring levels therein; and
- the hydroponic cultivation system further comprises a wiring circuit, configured to power a plant-compatible light source disposed over each hydroponic cultivation unit on each level, wherein:
the wiring circuit comprises a main stem, configured to run through each second pipe connecting two hydroponic cultivation units on every two neighboring levels.

14. The hydroponic cultivation system according to claim 13, wherein each hydroponic cultivation unit on each level comprises a wiring portion, wherein the wiring portion is provided with an upper opening and a lower opening, wherein:
the upper opening is connected with a bottom opening of one second pipe immediately above the each hydroponic cultivation unit;
the lower opening is connected with a top opening of another second pipe immediately below the each hydroponic cultivation unit; and
the main stem of the wiring circuit is configured to run through the wiring portion in the each hydroponic cultivation unit on the each level via the upper opening and the lower opening.

15. The hydroponic cultivation system according to claim 14, wherein:
the main stream of the wiring circuit comprises a plurality of segments, detachably connected with one another by means of a pair of first connectors arranged respectively at two opposing ends of two neighboring segments; and
at least one of the upper opening and the lower opening of the wiring portion in the each hydroponic cultivation unit on the each level is configured to expose one of the pair of first connectors to thereby allow a first electrical connection between the two neighboring segments.

16. The hydroponic cultivation system according to claim 14, wherein:
the wiring circuit further comprises a plurality of unit branches, electrically coupled to the main stem respectively, each configured to power a plant-compatible light source disposed over each hydroponic cultivation unit on each level; and
the wiring portion in the each hydroponic cultivation unit on the each level is further provided with a side opening, wherein each of the plurality of unit branches is electrically coupled to the main stem via the side opening.

17. The hydroponic cultivation system according to claim 16, wherein:
the main stream of the wiring circuit is provided with a plurality of short segments, each configured to be detachably connected with each of the plurality of unit branches by means of a pair of second connectors arranged respectively at a first end of one short segment distal to the main stem and a second end of one corresponding unit branch opposing to the first end; and
the side opening of the wiring portion in the each hydroponic cultivation unit on the each level is configured to expose the first end of the one short segment to thereby allow a second electrical connection between the main stem and the each of the plurality of unit branches.

18. The hydroponic cultivation system according to claim 16, wherein the plant-compatible light source disposed over each hydroponic cultivation unit on each level comprises at least one LED lamp, each configured to be electrically coupled to one unit branch of the wiring circuit corresponding to a level immediately above the each level.

19. The hydroponic cultivation system according to claim 18, wherein a tank of each hydroponic cultivation unit on each level comprises a sideline, wherein the sideline is provided with a plurality of slots, each corresponding to one LED lamp and configured to provide a mounting means for one unit branch corresponding the each level.

* * * * *